US012752369B2

(12) United States Patent
Ishikawa et al.

(10) Patent No.: US 12,752,369 B2
(45) Date of Patent: Oct. 6, 2026

(54) LASER MACHINING APPARATUS

(71) Applicant: Mitsubishi Electric Corporation, Tokyo (JP)

(72) Inventors: Kyohei Ishikawa, Tokyo (JP); Masaki Seguchi, Tokyo (JP); Motoaki Nishiwaki, Tokyo (JP); Kenta Fujii, Tokyo (JP); Tomotaka Katsura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 910 days.

(21) Appl. No.: 18/020,624

(22) PCT Filed: Aug. 27, 2020

(86) PCT No.: PCT/JP2020/032393
§ 371 (c)(1),
(2) Date: Feb. 10, 2023

(87) PCT Pub. No.: WO2022/044209
PCT Pub. Date: Mar. 3, 2022

(65) Prior Publication Data

US 2023/0321750 A1 Oct. 12, 2023

(51) Int. Cl.
*B23K 26/03* (2006.01)
*B23K 26/042* (2014.01)
(Continued)

(52) U.S. Cl.
CPC .......... *B23K 26/032* (2013.01); *B23K 26/042* (2015.10); *B23K 26/0643* (2013.01); (Continued)

(58) Field of Classification Search
CPC .... B23K 26/032; B23K 26/042; B23K 26/38; B23K 26/705; B23K 26/0643; B23K 26/0648; B23K 26/1464; B23K 31/006
See application file for complete search history.

(56) References Cited

U.S. PATENT DOCUMENTS 6,947,802 B2 9/2005 Picard et al.
11,226,599 B2 * 1/2022 Maeda .................. G06N 20/00
(Continued)

FOREIGN PATENT DOCUMENTS

EP 3769897 B1 7/2022
JP 2005-34885 A 2/2005
(Continued)

OTHER PUBLICATIONS

International Search Report and Written Opinion mailed on Oct. 13, 2020, received for PCT Application PCT/JP2020/032393, filed on Aug. 27, 2020, 10 pages including English Translation.

*Primary Examiner* — Brian W Jennison
(74) *Attorney, Agent, or Firm* — XSENSUS LLP

(57) ABSTRACT

A laser machining apparatus includes an actuator that changes relative positions of a machining head and a workpiece; a control unit that controls in machining execution the laser oscillator, the machining head, and the actuator based on a machining parameter; a machining state observation unit that detects, from process light that is light generated from the workpiece by laser beam irradiation, light intensities in a plurality of predetermined wavelength bands as a plurality of optical sensor signals; a feature extraction unit that extracts at least one of features, the features being obtainable from an index of correlation between the plurality of optical sensor signals and from one of the optical sensor signals; and a correction quantity calculation unit that determines the machining parameter to be corrected as a correction parameter and a correction quantity for the correction parameter based on the at least one of the features.

21 Claims, 11 Drawing Sheets

(51) Int. Cl.

| | |
|---|---|
| ***B23K 26/064*** | (2014.01) |
| ***B23K 26/14*** | (2014.01) |
| ***B23K 26/38*** | (2014.01) |
| ***B23K 26/70*** | (2014.01) |
| ***B23K 31/00*** | (2006.01) |

(52) U.S. Cl.
CPC .......... *B23K 26/0648* (2013.01); *B23K 26/38* (2013.01); *B23K 26/705* (2015.10); *B23K 26/1464* (2013.01); *B23K 31/006* (2013.01)

(56) References Cited

U.S. PATENT DOCUMENTS

| | | | | |
|---|---|---|---|---|
| 11,748,659 | B2 * | 9/2023 | Li ......................... | F16F 15/002 248/638 |
| 2005/0011867 | A1 | 1/2005 | Okuda et al. | |
| 2005/0205530 | A1 | 9/2005 | Picard et al. | |
| 2006/0108333 | A1 | 5/2006 | Picard et al. | |
| 2006/0219674 | A1 | 10/2006 | Picard et al. | |
| 2017/0232558 | A1 * | 8/2017 | Kano ................... | B23K 26/382 219/121.72 |
| 2017/0270434 | A1 | 9/2017 | Takigawa et al. | |
| 2019/0061049 | A1 * | 2/2019 | Kubo ................... | B23K 26/032 |
| 2019/0137969 | A1 * | 5/2019 | Watanabe .......... | G05B 19/4063 |
| 2020/0130107 | A1 * | 4/2020 | Mochizuki ........... | B23K 26/702 |

FOREIGN PATENT DOCUMENTS

| | | | |
|---|---|---|---|
| JP | 2006-521933 | A | 9/2006 |
| JP | 2011-206806 | A | 10/2011 |
| JP | 2017-164801 | A | 9/2017 |
| JP | 2019-39874 | A | 3/2019 |
| JP | 2019-166543 | A | 10/2019 |
| WO | 2020/250496 | A1 | 12/2020 |

* cited by examiner

LASER MACHINING APPARATUS

CROSS-REFERENCE TO RELATED APPLICATION

The present application is based on PCT filing PCT/JP2020/032393, filed Aug. 27, 2020, the entire contents of which are incorporated herein by reference.

FIELD

The present disclosure relates to a laser machining apparatus that machines a workpiece by laser beam irradiation.

BACKGROUND

Sheet metal laser machining starts with good machining; however, as the machining continues, machining defects may occur due to influence of heat buildup in a component of a machining head and in a workpiece. For sheet metal laser machining, there are plural machining parameter items, such as a focal position, cutting speed, gas pressure, and laser output power, and plural machining result items, such as a quantity of adhered substance and machined surface roughness, so adjustment work requires a relatively long time.

A laser processing machine disclosed in Patent Literature 1 includes a detector that detects returned light heading for a laser processing head from a side where a processed point is during laser light irradiation and a monitoring section that monitors a laser processing state by selecting a time-series level of light in a specific wavelength band corresponding to a processing condition from the returned light detected by the detector.

CITATION LIST

Patent Literature

Patent Literature 1: Japanese Patent Application

SUMMARY

Technical Problems

Since the laser machining apparatus disclosed in Patent Literature 1 performs monitoring based on the selected time-series level of light, the laser machining apparatus has lower accuracy in detecting the processing state. In addition, since the laser machining apparatus disclosed in Patent Literature 1 only determines whether processing is good or bad, adjustment of the processing condition is difficult.

The present disclosure has been made in view of the above, and an object of the present disclosure is to obtain a laser machining apparatus that performs machining state detection and machining condition on adjustment at a higher speed or with higher accuracy.

Solution to Problem

To solve the aforementioned problem and achieve the object, a laser machining apparatus according to the present disclosure includes: an actuator that changes relative positions of a machining head and an object to be machined, the machining head including a focusing system to focus a laser beam emitted from a laser oscillator and irradiate the object to be machined and a machining gas supply unit to supply a machining gas to the object to be machined; a control unit that controls in machining execution the laser oscillator, the machining head, and the actuator on a basis of a machining parameter, the machining parameter being a laser beam machining-related numeric parameter; a machining state observation unit that detects, from process light, light intensities in a plurality of predetermined wavelength bands of interest as a plurality of optical sensor signals, the process light being light generated from the object to be machined by laser beam irradiation; a feature extraction unit that extracts at least one of features, the features being obtainable from an index of correlation between the plurality of optical sensor signals and from one of the optical sensor signals; and a correction quantity calculation unit that determines the machining parameter to be corrected as a correction parameter and a correction quantity for the correction parameter on a basis of the at least one of the features.

Advantageous Effect of Invention

The laser machining apparatus according to the present disclosure produces an effect of performing machining state detection and machining condition adjustment at a higher speed or with higher accuracy.

DESCRIPTION OF EMBODIMENTS

With reference to the drawings, a detailed description is hereinafter provided of laser machining apparatuses according to embodiments.

First Embodiment

Figure 1:
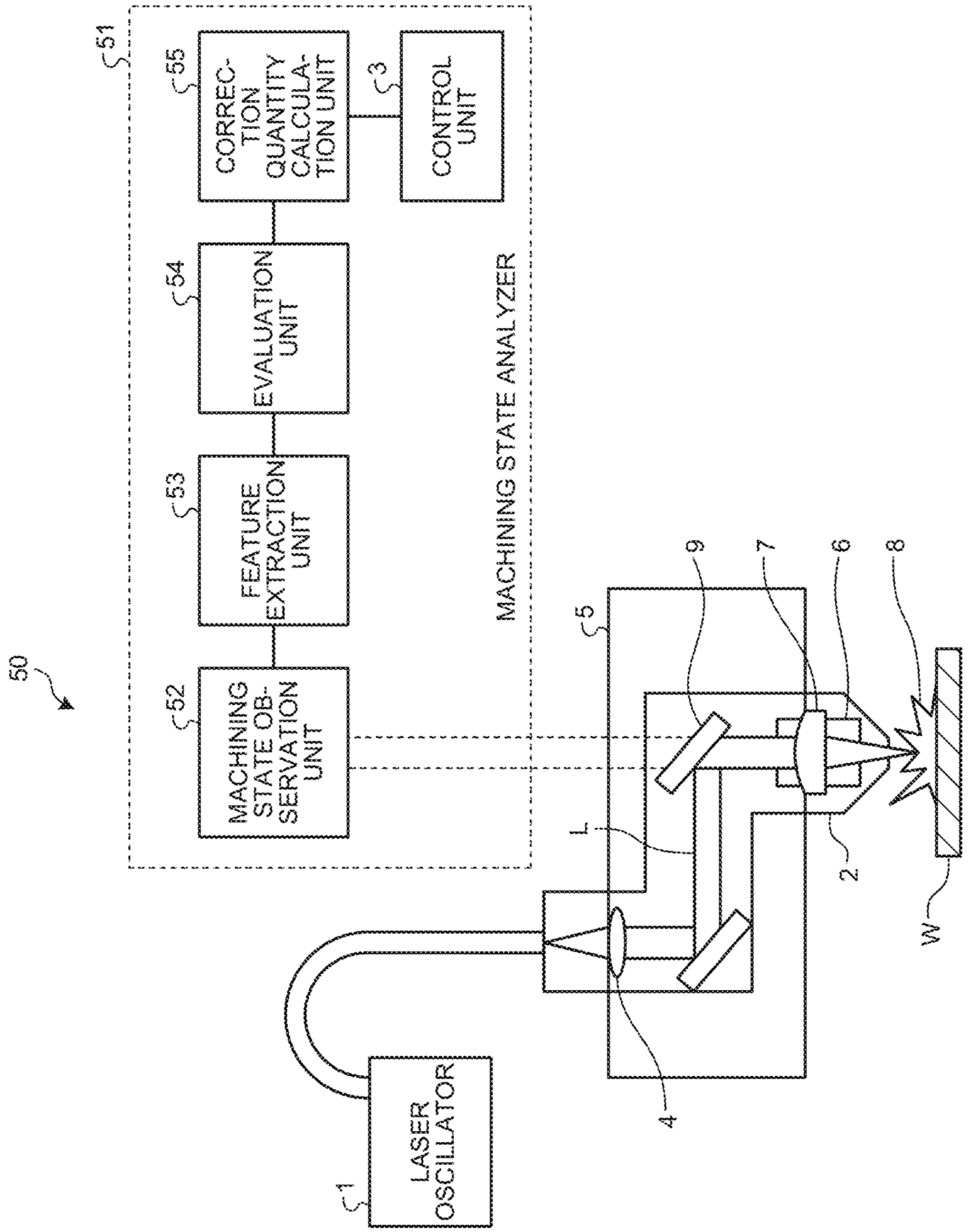
FIG. 1 is a diagram illustrating a configuration of a laser machining apparatus according to a first embodiment.

FIG. 1 is a diagram illustrating a configuration of a laser machining apparatus 50 according to a first embodiment. The laser machining apparatus 50 includes a laser oscillator 1, a machining head 2, an actuator 5, and a control unit 3. The laser machining apparatus 50 includes a machining state analyzer 51 that includes the control unit 3. The laser oscillator 1 emits an oscillated laser beam L. The laser beam L has a wavelength selected with absorptance and reflectance of an object to be machined by the laser beam L considered. For example, the wavelength of the laser beam L is somewhere between 0.193 μm and 11 μm, inclusive. The object to be machined is a workpiece W. The laser beam L emitted from the laser oscillator 1 is supplied to the machining head 2 via an optical path.

The machining head 2 includes a focusing system that focuses the laser beam emitted from the laser oscillator 1 to irradiate the workpiece W, which is the object to be machined, and a machining gas supply unit that supplies a machining gas to the workpiece W. The machining gas supply unit is not illustrated in FIG. 1. The machining gas is supplied into the machining head 2 and squirted at the workpiece W by the machining gas supply unit when the workpiece W is irradiated with the laser beam L. The machining head includes a plurality of collimator lenses 4 as a lens group and a converging lens 7. The collimator lenses 4 and the converging lens 7 are an example of the focusing system. The laser beam L emitted from the laser oscillator 1 is collimated by the collimator lenses 4 and converged by the converging lens 7. The workpiece W is irradiated with the converged laser beam L. The machining head 2 condenses the laser beam L and irradiates the workpiece W with the laser beam L, thus cutting the workpiece W.

The machining head 2 includes a nozzle not illustrated. The nozzle has an opening on an optical path for the laser beam L between the converging lens 7 and the workpiece W, and the laser beam L and the machining gas pass through the opening. Generally, a motor and a motor drive unit that are not illustrated are provided at a shaft where the machining head 2 is installed or at a machining table on which the workpiece W is placed.

The actuator 5 changes relative positions of the machining head 2 and the workpiece W. On the basis of machining parameters that are laser beam machining-related numeric parameters, the control unit 3 controls the laser oscillator 1, the machining head 2, and the actuator 5 in executing machining. Specifically, the control unit 3 controls the motor drive unit, and under the control of the control unit 3, the motor drive unit controls the motor. The actuator 5 operates with operation of the motor to change the relative positions of the machining head 2 and the workpiece W. The machining head 2 includes a converging lens position change drive unit 6 that changes a positional relationship between a focal position of the focusing system for the laser beam L and the workpiece W.

The laser oscillator 1 is of a non-limiting type. The laser oscillator 1 is, for example, a fiber laser oscillator. The laser oscillator 1 may be a direct diode laser, a carbon dioxide laser, a copper vapor laser, one of various ion lasers, or a solid-state laser. The solid-state laser is, for example, a laser using a yttrium aluminum garnet (YAG) crystal as an excitation medium. The laser machining apparatus 50 may include a wavelength conversion unit that performs wavelength conversion on the laser beam generated by the laser oscillator 1.

In accordance with a machining program and the machining parameters that indicate machining conditions, the control unit 3 controls the laser oscillator 1, the motor drive unit, and the converging lens position change drive unit 6 so that the laser beam 1, scans a machining path on the workpiece W. Examples of the machining parameters that are related to the control of the control unit 3 include laser output power, machining gas pressure, machining speed, the focal position of the focusing system, a diameter of the converged beam from the focusing system, a pulse frequency of the laser, a duty ratio of a pulse of the laser, magnification of the focusing system for the laser, a diameter of the nozzle, distance between the workpiece W and the nozzle, type of laser beam mode, and a positional relationship between a center of a nozzle hole and the laser beam L. The machining parameters are not limited to the above-mentioned examples. The machining parameters may be determined on the basis of either the type of laser to be used or a function of the laser oscillator 1, or both.

On the basis of correction quantities that are calculated by the machining state analyzer 51 as described later, the machining parameters that are used by the control unit 3 can be changed. In other words, the machining parameters can be corrected by the machining state analyzer 51. Before being corrected by the machining state analyzer 51, the machining parameters are predefined correspondingly to, for example, contents of the machining. The laser machining apparatus 50 may include an input means that receives inputs from a worker, and the machining parameters may be changed by the inputs from the worker before being corrected by the machining state analyzer 51. The machining parameters may be transmitted from a device not illustrated to the laser machining apparatus 50 before being corrected by the machining state analyzer 51. The above device is, for example, a computer.

The laser beam L emitted from the laser oscillator 1 is collimated by the collimator lenses 4 and converged by the converging lens 7. The workpiece h is irradiated with the converged laser beam L. By being irradiated with the laser beam L, the workpiece W experiences, for example, phenomena such as evaporation and melting and generates process light 8. The generated process light 8 goes into the machining head 2.

The laser machining apparatus 50 also includes a mirror 9. Through the converging lens 7, the process light 8 is transmitted by the mirror 9. The mirror 9 has a property of transmitting light having wavelengths other than the wavelength of the laser beam L. The process light 8 transmitted by the mirror 9 is converted into time-series signals by a machining state observation unit 52. The machining state observation unit 52 is included in the machining state analyzer 51. From the process light 8 that is the light generated from the workpiece W by laser beam irradiation, the workpiece W being the object to be machined, the machining state observation unit 52 detects light intensities in a plurality of predetermined wavelength bands of interest as the plurality of optical sensor signals.

The machining state analyzer 51 further includes a feature extraction unit 53 that extracts a feature that serves as an index of correlation between the plurality of optical sensor signals; an evaluation unit 54 that determines for at least one of a plurality of machining defect items whether the machining is good or bad on the basis of the feature in obtaining a determination result; and a correction quantity calculation unit 55 that determines a machining parameter to be corrected as a correction parameter and a correction quantity for the correction parameter on the basis of the feature. To be specific, the correction quantity calculation unit 55 determines the correction parameter to be corrected and the correction quantity for the correction parameter on the basis of the above-mentioned determination result. The above plurality of machining defect items include at least one of items for cut surface roughness in terms of quality, gouging, dross, or peeling off of an oxide film. Since the plurality of machining defect items include the at least one of items for the cut surface roughness in terms of quality, the gouging, the dross, or the peeling off of the oxide film, the laser machining apparatus 50 is capable of noticeable machining parameter correction. The feature extraction unit 53 extracts at least one of features, the features are obtainable from an index of correlation between the plurality of optical sensor signals and from one of the optical sensor signals.

Further, the correction quantity calculation unit 55 may determine at least one of cutting speed, the focal position, the diameter of the converged beam, the gas pressure, or the laser output power as the machining parameter to be corrected and determine the correction quantity for the machining parameter. If the machining parameter is the at least one of the cutting speed, the focal position, the diameter of the converged beam, the gas pressure, or the laser output power, when the machining is in a state defined as a bad machining state, the laser machining apparatus 50 enables the machining to quickly return from the state defined as the bad machining state to what is defined as a Good machining state.

The time series signals obtained by the machining state observation unit 52 are converted into the features by the feature extraction unit 53 for use in determination of machining states, such as quality of a machining result, a degree of machining defectiveness, a degree of deviation of a good machining result, and a forerunner of a machining defect, by the evaluation unit 54. The correction quantity calculation unit 55 sends to the control unit 3 a command that changes the machining parameter on the basis of the determination result obtained by the evaluation unit 54. The machining parameter is changed by the command during actual machining for the machining to continue. The evaluation unit 54 may be included in the correction quantity calculation unit 55.

Figure 2:
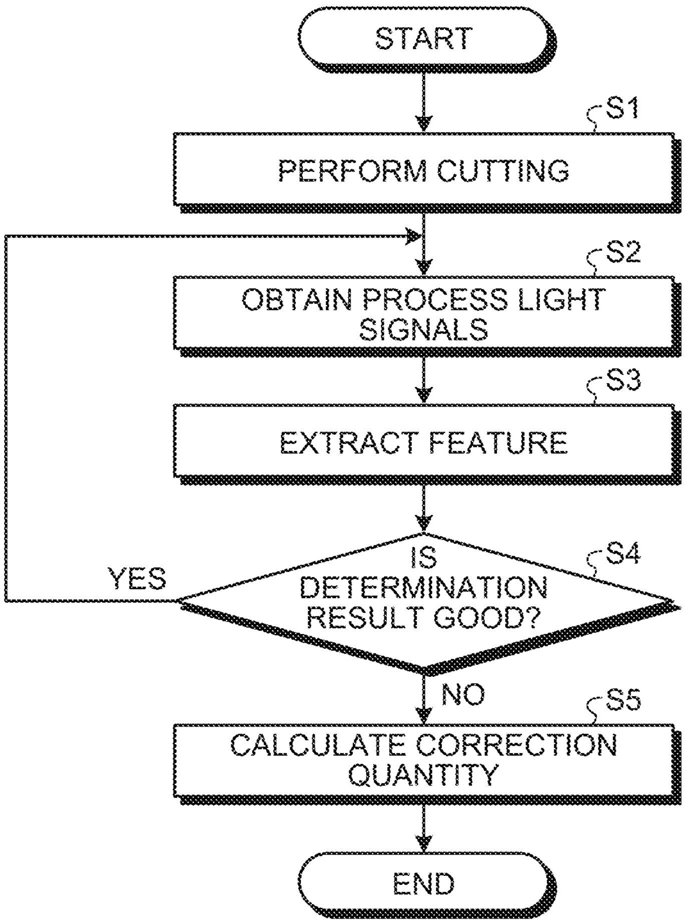
FIG. 2 is a flowchart illustrating an example of a machining parameter adjustment-related operational procedure of the laser machining apparatus according to the first embodiment.

A description is provided next of operation according to the first embodiment. FIG. 2 is a flowchart illustrating an example of a machining parameter adjustment-related operational procedure of the laser machining apparatus 50 according to the first embodiment. The laser machining apparatus 50 performs cutting first (S1). Next, the machining state observation unit 52 obtains process light signals from the process light 8 caused by laser beam machining (S2). The feature extraction unit 53 extracts the features from the time-series signals obtained by the machining state observation unit 52 (S3).

The evaluation unit 54 determines the quality of a machining result on the basis of the extracted features (S4). If the evaluation unit 54 determines a good determination result on the machining (Yes at S4), the laser machining apparatus 50 moves to step S2 in the operation and goes on with the machining without changing any machining parameters. If the evaluation unit 54 determines a bad determination result on the machining (No at S4), the correction quantity calculation unit 55 determines a machining parameter to be changed and calculates a correction quantity for the machining parameter to be changed (S5). The correction quantity calculation unit 55 outputs the calculated correction quantity to the control unit 3. The laser machining apparatus 50 performs machining based on the correction quantity. The operation illustrated in FIG. 2 is executed at, but not limited to, a point in the course of production machining.

Figure 3:
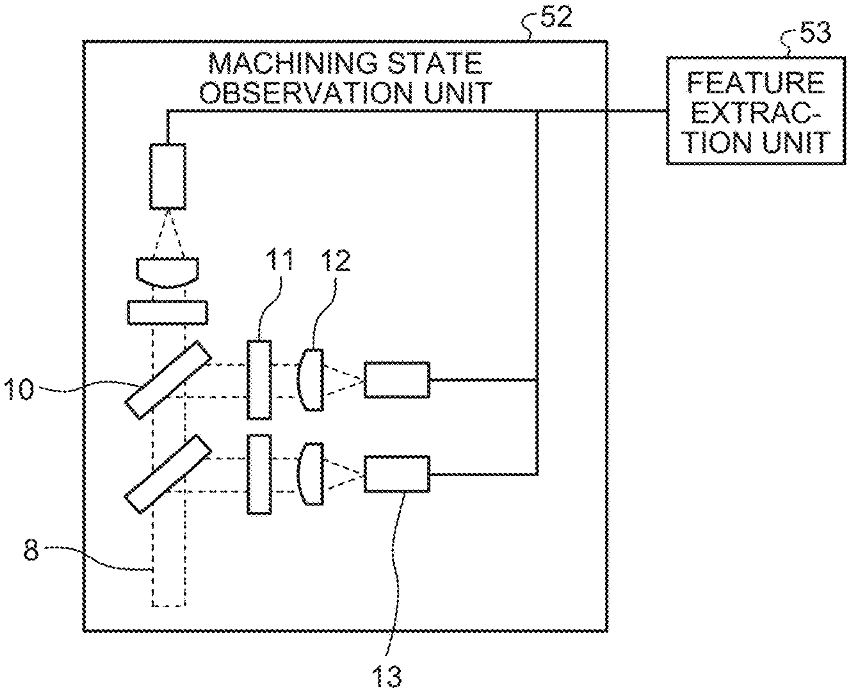
FIG. 3 is a diagram illustrating a configuration of a machining state observation unit of the laser machining apparatus according to the first embodiment.

A description is provided of details of the machining state observation unit 52. FIG. 3 is a diagram illustrating a configuration of the machining state observation unit 52 of the laser machining apparatus 50 according to the first embodiment. The feature extraction unit 53 is also illustrated in FIG. 3. The machining state observation unit 52 includes beam splitters 10, a plurality of wavelength filters 11, a plurality of imaging lenses 12, and a plurality of optical sensors 13.

The process light 8 transmitted by the mirror 9 illustrated in FIG. 1 is divided by the beam splitters 10. Each of the plurality of wavelength filters 11 transmits process light 8 having its corresponding wavelength band among a fraction of the process light 8. The process light 8 transmitted by each of the plurality of wavelength filters 11 is caused by the imaging lens 12 to be received by the corresponding optical sensor 13 among the plurality of optical sensors 13. Each of the plurality of optical sensors 13 outputs the light intensity of the process light 8 as the time-series signal. The signals output from the plurality of optical sensors 13 are sent to the feature extraction unit 53.

A description is provided of characteristics of the process light 8. The process light 8 is mainly caused by thermal radiation from the workpiece W. The light caused by the thermal radiation is the light having a peak at a wavelength that depends on temperature of molten metal, and its wavelength distribution is determined solely by the temperature. As the temperature increases, the wavelength peak shifts to a shorter wavelength. A quantity of process light 8 differs depending on machined states including, for example, a cutting width shape and a cutting front shape that are formed by machining the workpiece. Moreover, a quantity of process light 8 that goes into the machining head 2 differs depending on shape of the nozzle used. For example, if sheet metal machining speed is higher, the cutting front shape has a greater inclination, allowing the laser beam L to strike its larger area. Therefore, the temperature of the molten metal is higher, and a larger quantity of process light 8 returns to an interior of the machining head 2.

The machining state observation unit 52 divides the process light 8 for the purpose of detailed machining state observation. The machining state observation unit 52 has the plurality of wavelength filters 11. Each of the plurality of wavelength filters 11 transmits light having a wavelength different from a wavelength of light that another wavelength filter 11 transmits. The process light 8 transmitted by each of the plurality of wavelength filters 11 enters one of the plurality of optical sensors 13.

Figure 4:
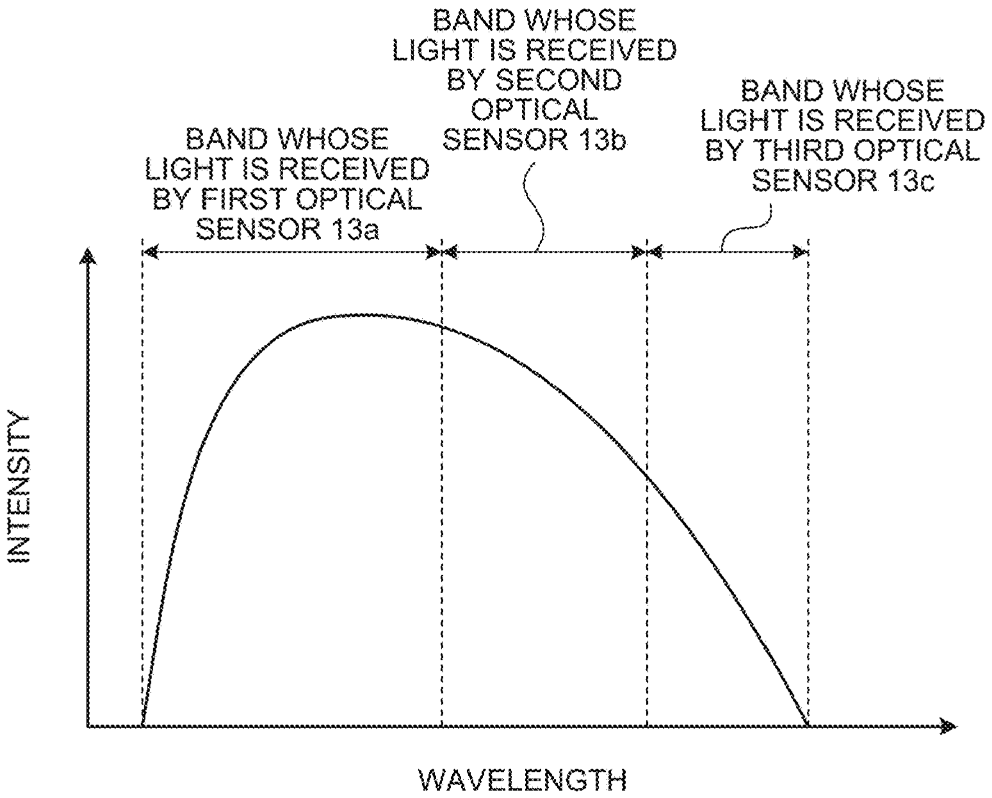
FIG. 4 is a diagram illustrating examples of wavelength bands whose light is received by a first, a second, and a third optical sensor of the laser machining apparatus according to the first embodiment.

Suppose that the plurality of optical sensors 13 are a first optical sensor 13*a*, a second optical sensor 13*b*, and a third optical sensor 13*c*. FIG. 4 is a diagram illustrating examples of wavelength bands whose light is received by the first, second, and third optical sensors 13*a*, 13*b*, and 13*c* of the laser machining apparatus 50 according to the first embodiment. For example, the first optical sensor 13*a* receives the process light 8 in the shorter wavelength band, the third optical sensor 13*c* receives the process light 8 in the longer wavelength band, and the second optical sensor 13*b* receives the process light 8 in the intermediate wavelength band between light wavelengths that are received by the first and third optical sensors 13*a* and 13*c*.

The first, second, and third optical sensors 13*a*, 13*b*, and 13*c* do not need to receive the process light 8 in a range of all wavelengths but may receive the process light 8 in certain ranges of wavelengths. The machining state observation unit 52 is capable of observing how wavelength distributions change on the basis of a ratio between the respective light intensities of the wavelength bands that are received by the first, second, and third optical sensors 13*a*, 13*b*, and 13*c* and a proportion of the light intensity that is received by each of the first, second, and third optical sensors 13*a*, 13*b*, and 13*c* to total intensity. The total intensity refers to all the light intensities that are received by the first, second, and third optical sensors 13*a*, 13*b*, and 13*c*.

The machining state observation unit 52 is capable of observing the time-series signals and the changing quantity of process light 8 as the sum of the light intensities that are received respectively by the first, second, and third optical sensors 13*a*, 13*b*, and 13*c*. With only light having the wavelength of the laser beam L not transmitted, the optical sensors 13 that receive the process light 8 having wavelengths other than the wavelength of the laser beam L may be disposed.

Figure 5:
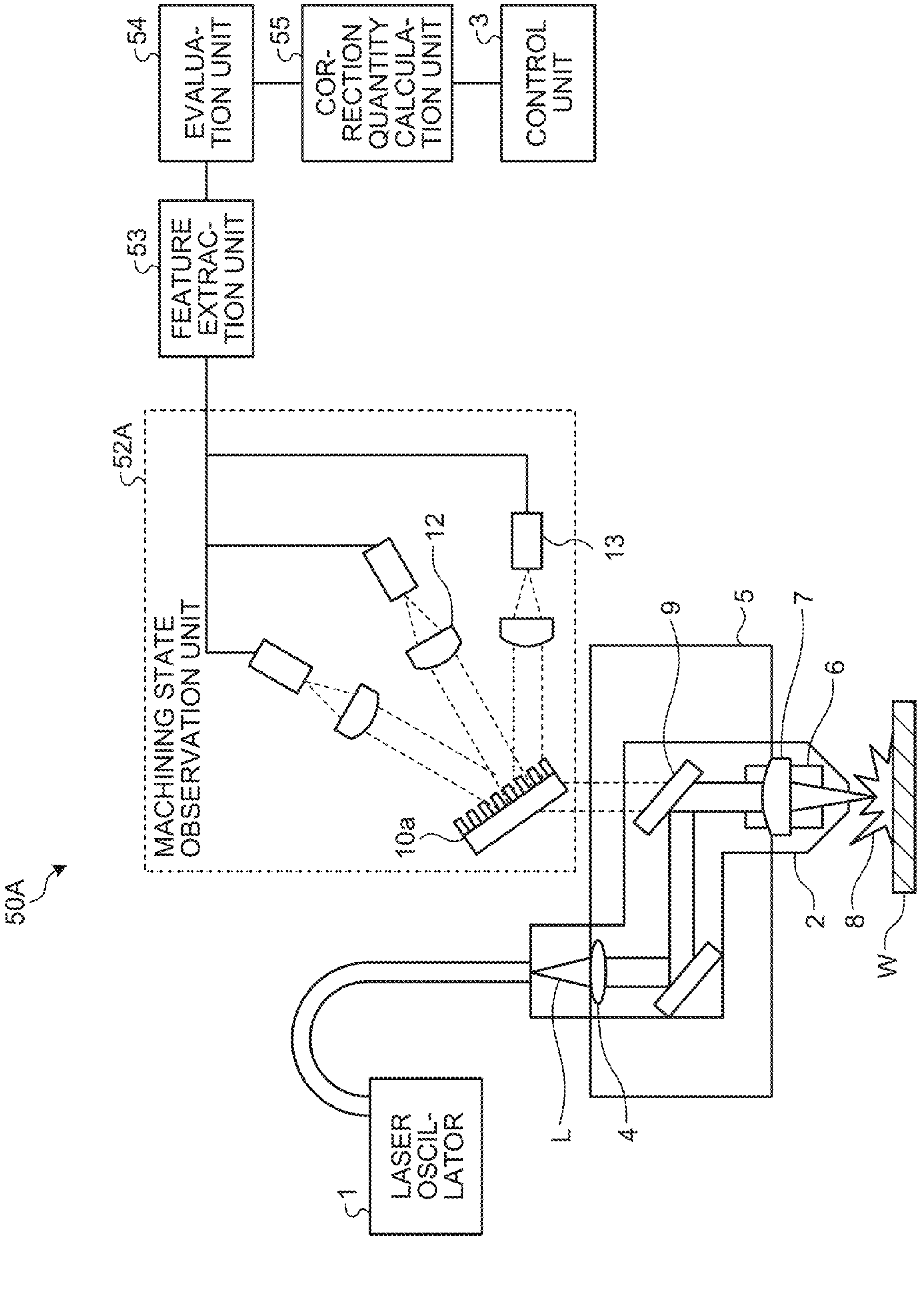
FIG. 5 is a diagram illustrating a configuration of a laser machining apparatus according to a first modification of the first embodiment.
Figure 6:
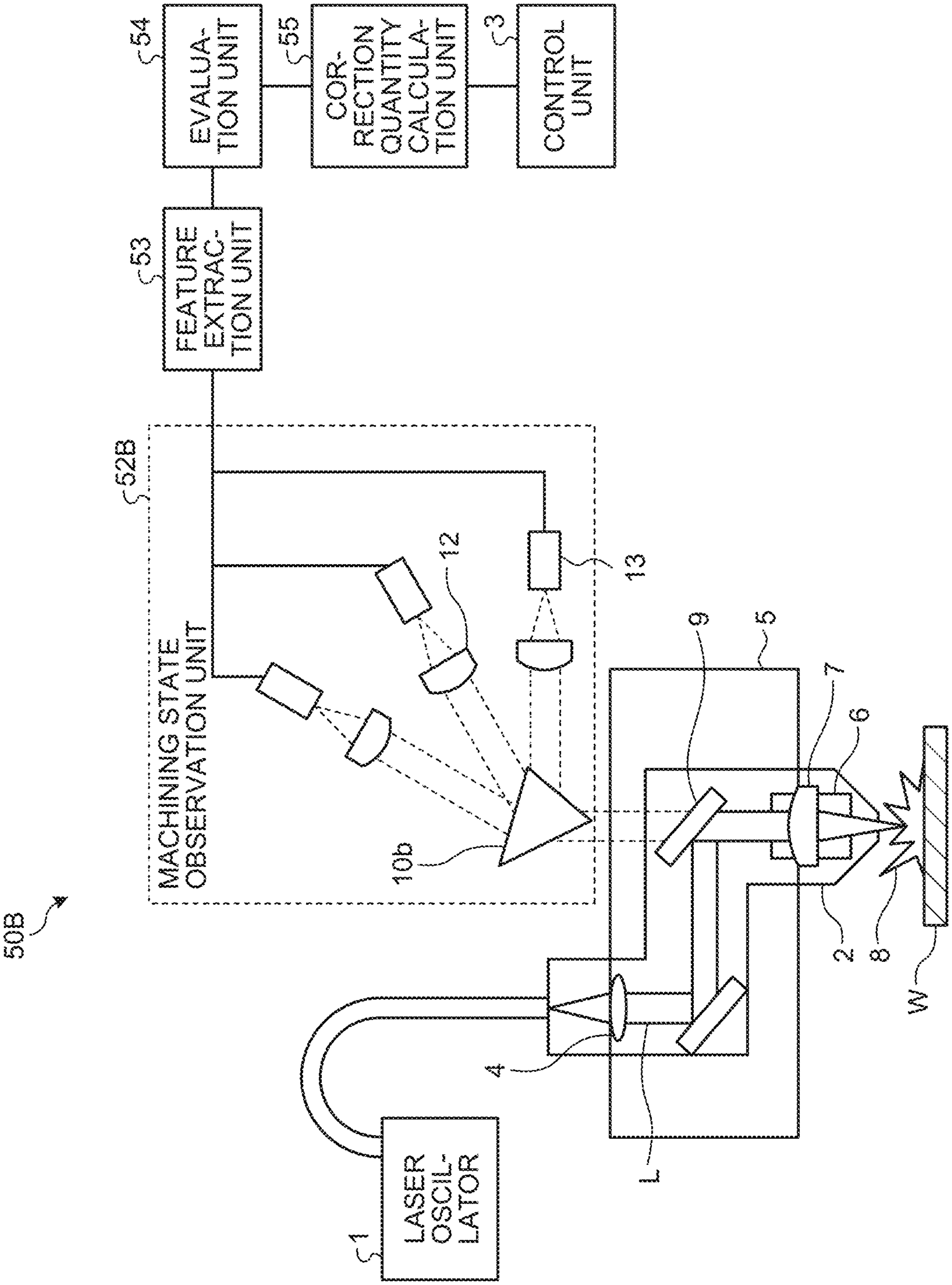
FIG. 6 is a diagram illustrating a configuration of a laser machining apparatus according to a second modification of the first embodiment.

The machining state observation unit 52 may change wavelengths of light that enters the optical sensors 13 by combining the beam splitters 10 and the wavelength filters 11. The machining state observation unit 52 may be replaced by a machining state observation unit 52A that includes a diffraction grating 10*a*, as illustrated in FIG. 5. FIG. 5 is a diagram illustrating a configuration of a laser machining apparatus 50A according to a first modification of the first embodiment. The laser machining apparatus 50A includes the machining state observation unit 52A that uses the diffraction grating 10*a* for spectroscopy. The machining state observation unit 52 may be replaced by a machining state observation unit 52B that includes a prism 10*b*, as illustrated in FIG. 6. FIG. 6 is a diagram illustrating a configuration of a laser machining apparatus 50B according to a second modification of the first embodiment. The laser machining apparatus 50B includes the machining state observation unit 52B that uses the prism 10*b* for spectroscopy.

The optical sensors 13 included in the machining state observation unit 52 may be silicon (Si) photodiodes sensitive to light having wavelengths between 400 nm to 1100 nm, inclusive, or indium gallium arsenide (InGaAs) photodiodes sensitive to light having wavelengths longer than or equal to a near-infrared wavelength. One of the plurality of wavelength filters 11 may be a shortpass filter that transmits light having wavelengths shorter than or equal to a first wavelength. Another of the plurality of wavelength filters 11 may be a longpass filter that transmits light having wavelengths longer than or equal to a second wavelength that is longer than the first wavelength. Yet another of the plurality of wavelength filters 11 may be a bandpass filter that transmits light having wavelengths longer than the first wavelength and shorter than the second wavelength.

To obtain the process light 8 in a more suitable wavelength band, the wavelength filter 11 may be a bandpass filter obtained by combining a shortpass filter and a longpass filter. For example, a shortpass filter that transmits light having wavelengths shorter than 500 nm, a bandpass filter that transmits light having wavelengths between 500 nm and 700 nm, inclusive, and a highpass filter that transmits light having wavelengths longer than 700 nm may be combined.

One of the plurality of wavelength filters 11 may be a first wavelength filter that transmits light having wavelengths shorter than 525 nm. Another of the plurality, of wavelength filters 11 may be a second wavelength filter that transmits light having wavelengths longer than 700 nm. Yet another of the plurality of wavelength filters 11 may be a third wavelength filter that transmits light having wavelengths between 530 nm and 700 nm, inclusive.

One of the plurality of wavelength filters 11 may be a wavelength filter that transmits light having wavelengths between 475 nm and 525 nm, inclusive. Another of the plurality of wavelength filters 11 may be a wavelength filter that transmits light having wavelengths between 575 nm and 625 nm, inclusive. Yet another of the plurality of wavelength filters 11 may be a wavelength filter that transmits light having wavelengths between 675 nm and 725 nm, inclusive.

One of the plurality of wavelength filters 11 may be a wavelength filter that transmits light having wavelengths between 400 nm and 800 nm, inclusive. Another of the plurality of wavelength filters 11 may be a wavelength filter that transmits light having wavelengths between 475 nm and 525 nm, inclusive. Yet another of the plurality of wavelength filters 11 may be a wavelength filter that transmits light having wavelengths between 675 nm and 725 nm, inclusive. With the machining state observation unit 52 having the plurality of wavelength filters 11 described above, the machining state analyzer 51 is capable of better machining parameter correction and detailed machining defect item detection.

One of the plurality of optical sensors 13 may be disposed at a position aligned with an irradiation direction of the laser beam L, which is the emitted laser beam of the laser oscillator 1, toward a machining point or at a position aligned with a direction different from the irradiation direction of the laser beam L toward the machining point. Arranging the optical sensors 13 at both the positions enables the changing intensity ratios of the process light 8 due to the differences in position to be compared and also enables the changing wavelength distributions due to the differences in position to be compared. From the comparison between the intensity ratios due to the differences in position, inclination of the light entering the machining head 2 can be ascertained. In other words, the arrangement of the optical sensors 13 at both the positions enables the as machining apparatus 50 to perform higher-accuracy machining parameter correction.

Figure 7:
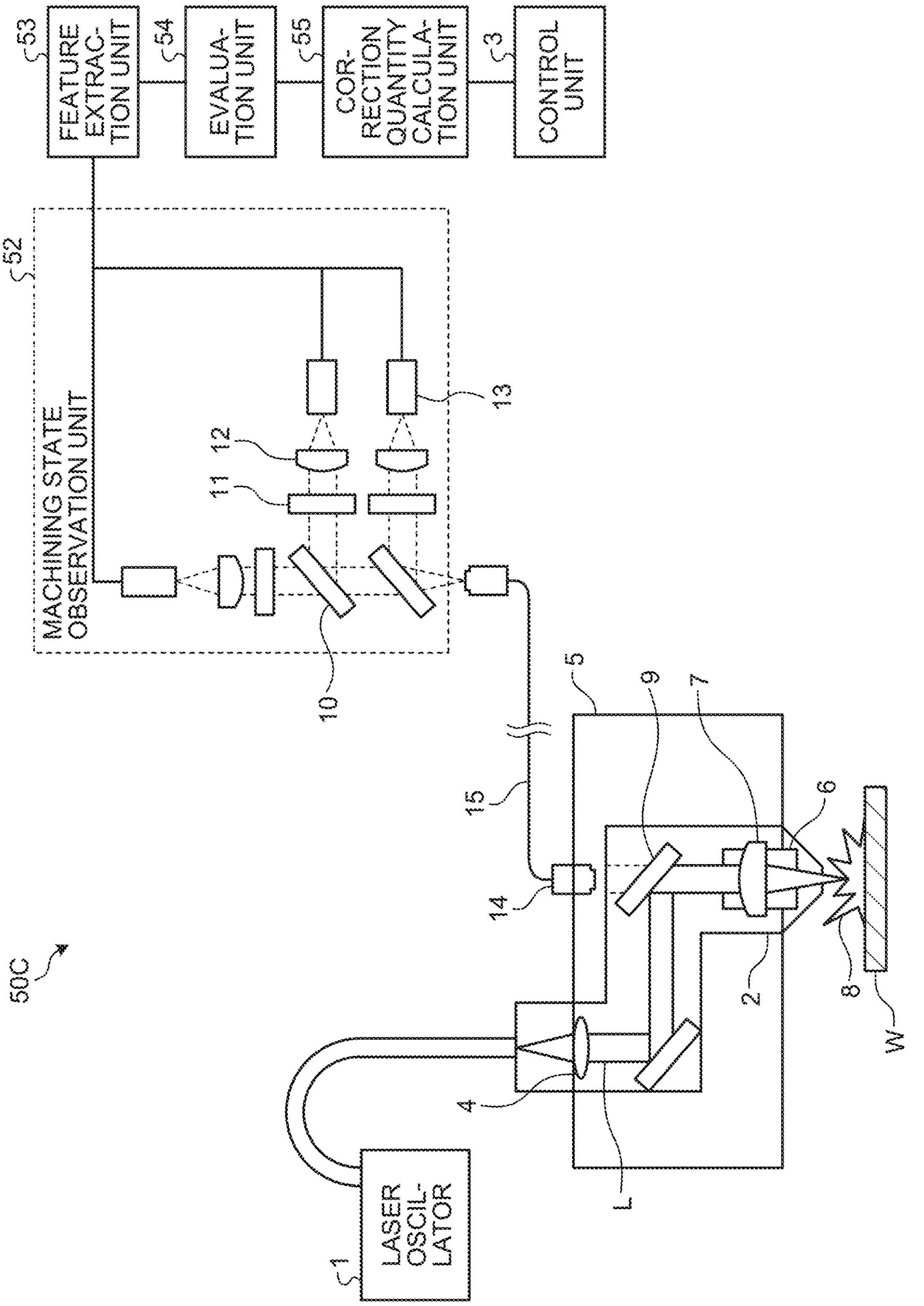
FIG. 7 is a diagram illustrating a configuration of a laser machining apparatus according to a third modification of the first embodiment.

FIG. 7 is a diagram illustrating a configuration of a laser machining apparatus 50C according to a third modification of the first embodiment. The laser machining apparatus 50C includes all the constituent elements of the laser machining apparatus 50, a collimator lens 14 coupled to the machining head 2, and an optical fiber 15 connecting the collimator lens 14 and the machining state observation unit 52. As illustrated in FIG. 7, the process light 8 may be transmitted from the machining head 2 to the machining state observation unit 52 by the optical fiber 15. Although FIG. 7 does not illustrate a frame that indicates the machining state analyzer 51, the machining state observation unit 52 is included in the machining state analyzer 51. Since the machining state analyzer 51 that includes the machining state observation unit 52 is disposed externally to the machining head 2, the laser machining apparatus 50C has an effect of having the machining head 2 that is smaller and lighter in weight. During machining, on the basis of the process light 8 transmitted from the machining head 2 by the optical fiber 15, the laser machining apparatus 50C determines a correction quantity for a machining parameter or determines whether the machining is good or bad for a machining defect item to be corrected.

In cases where the laser oscillator 1 is a fiber laser or a laser oscillator that enables fiber transmission, analysis using the process light 8 that returns to a fiber possible. Therefore, the machining state analyzer 51 is enabled to be disposed inside the laser oscillator 1.

The feature extraction unit 53 converts the time-series signals output from the machining state observation unit 52 into the features. There are various feature preparation methods. The feature extraction unit 53 can use a set of values as the feature. The set of values can be obtained by analyzing the time-series signal, namely performing mean value calculation, statistics calculation such as standard deviation calculation, frequency analysis, filterbank analysis, or wavelet transformation on the time-series signal obtained from the machining state observation unit 52.

The above feature preparation methods are examples. The feature extraction unit 53 may prepare the features by using a general analysis method for the time-series signals. The feature extraction unit 53 may output one feature or more features. The feature extraction unit 53 may store at the start of machining the feature and its position in a feature space and use a variation in the feature and a variation in the position, too, as features. This enables the laser machining apparatus 50 to also determine transition of the feature from an initial machining state and detect a forerunner of a machining defect.

The feature extraction unit 53 may extract the features that reflect respective output values of the plurality of optical sensors 13 or a feature combining the respective output values of the optical sensors 13.

On the basis of the features extracted by the feature extraction unit 53, the evaluation unit 54 determines whether the ongoing machining is good or bad. The evaluation unit 54 may output only a result that indicates good or bad machining or an evaluation value for the machining. Instead of making a binary determination of good or bad, the evaluation unit 54 may determine a value that approaches 0 with increasing probability of good and 1 with increasing probability of bad. The value is one of contiguous numbers. For example, the evaluation unit 54 may calculate an evaluation value that tells that the probability of good is 90% and that the probability of bad is 10%.

In cases where the determination result on the quality of machining is bad, the evaluation unit 54 may provide an output indicating whether or not there are any subdivided symptoms of the machining defect items. Examples of the items include adhesion of molten metal to a cut surface during laser cutting, generation of dross at a lower edge of the cut surface, and periodic roughness in an upper part of the cut surface. Recesses of striations are deeper when the roughness occurs than when no roughness occurs. The evaluation unit 54 may detect whether or not there is a symptom of the peeling off of the oxide film on the cut surface. The oxide film peels off when the machining gas to be used in cutting is oxygen.

The machining defect items are not limited to the above-mentioned examples. For example, the evaluation unit 54 may determine other machining defect items, such as discoloration of the workpiece W and the presence or absence of a vibrating surface. The evaluation unit 54 may change the machining defect items for which determinations are made correspondingly to, for example, the machining parameters, such as the laser output power, the machining speed, workpiece thickness, and a machining gas type, the workpiece thickness being a plate thickness of the workpiece.

For example, in cases where the machining gas type is oxygen, oxide film formation occurs on a cut surface, so a determination as to whether or not there is the oxide film's peeling off is needed. However, in cases where the machining gas type is nitrogen, the oxide film formation does not occur on the cut surface, so the determination as to whether or not there is the oxide film's peeling off is not needed. Therefore, the evaluation unit 54 does not have to make a determination about the peeling off of the oxide film if the machining gas type is nitrogen.

The evaluation unit 54 may output a result that indicates good or bad machining after considering the presence or absence of each of the machining defect items comprehensively. If the evaluation unit 54 determines that a machining result is bad after only determining whether the machining is good or bad, the evaluation unit 54 may analyse the symptoms of the machining defect items.

The evaluation unit 54 may cause a display unit internal or external to the laser machining apparatus 50 to display the determination result. The evaluation unit 54 may cause the display unit internal or external to the laser machining apparatus 50 to display the determination result only when the determination result on the quality of cutting is bad. The display unit is not illustrated.

The evaluation unit 54 may use not only the features output from the feature extraction unit 53 but also different information in making a determination on the quality. An example of the different information refers to part or all of ongoing machining-related machining parameters, temperature of an optical system included in the machining head 2, a temperature change of the optical system inside the machining head 2, the workpiece thickness, and a machining material. The workpiece thickness is a thickness of the workpiece W along an incident direction of the laser beam. The machining material is a material of which the workpiece W is made.

In cases where the determination result output from the evaluation unit 54 is not good, the correction quantity calculation unit 55 calculates the correction quantity for the machining parameter on the basis of the determination result output from the evaluation unit 54. The correction quantity calculation unit 55 outputs the calculated correction quantity to the control unit 3. The correction quantity calculation unit 55 is capable of obtaining the machining parameters set in the control unit 3 and may calculate the correction quantity on the basis of the determination result output from the evaluation unit 54 and the currently set machining parameters.

On the basis of the correct ion quantity received from the correction quantity calculation unit 55, the control unit 3 corrects the machining parameter, thereby executing machining. Thus the laser machining apparatus 50 performs machining based on a condition whose machining parameter is corrected when the determination result obtained by the evaluation unit 54 is bad. The machining parameter correction is repeated until the evaluation unit 54 outputs a good determination result.

Next, a detailed description is provided of the calculation of the correction quantity for the machining parameter. Examples of the machining parameter to be corrected include the laser output power, the machining gas pressure, the machining speed, the focal position of the focusing system, the diameter of the converged beam from the focusing system, the pulse frequency of the laser, the duty ratio of the pulse of the laser, the magnification of the focusing system for the laser, the diameter of the nozzle, the distance between the workpiece W and the nozzle, the type of mode for the laser beam L, and the positional relationship between the center of the nozzle hole and the laser beam L.

In cases where determination results on the respective machining defect items are output as evaluation values from the evaluation unit 54, the correction quantity calculation unit 55 may determine a machining parameter (or machining parameters) to be corrected and a correction quantity (or correction quantities) for the machining parameter(s) on the basis of a combination pattern composed of these quality determination results on the respective machining defect items. The combination pattern is, for example, a combination of three evaluation values, such as 0, 0, and 1, that are output by the evaluation unit 54 correspondingly to the determinations on the roughness, the peeling off of the oxide film, and the dross, with the determination result being good when the evaluation value is 1 and bad when the evaluation value is 0.

If, for example, only the value that corresponds to the determination on the dross is 1, with the other values being 0, the correction quantity calculation unit 55 targets the laser output power and the machining gas pressure for correction quantity calculation among the machining parameters and determines a correction quantity that increases the laser output power and a correction quantity that decreases the machining gas pressure. In this manner, the machining parameter(s) to be corrected and the correction quantity (correction quantities) for the machining parameter(s) can be determined for each of combination patterns.

In cases where the quality determination results on the respective machining defect items are output from the evaluation unit 54 as evaluation values that each indicate the degree of defectiveness, the correction quantity calculation unit 55 may change for each of the machining defect items the correction quantity (correction quantities) for the machining parameter(s) to be corrected by weighting the correction quantity (correction quantities) or change the machining parameter (s) itself (themselves) to be corrected correspondingly to the evaluation value for each machining defect item.

For example, suppose that the evaluation unit 54 outputs values that each correspond to one of three or more numerical levels between 0 and 1, inclusive, as evaluation values for the respective machining defect items. For the determination on the dross, for example, the evaluation value is defined as 0, 0.3, 0.6, or 1.0 on a four-level scale, and correction quantities for the laser output power and the machining gas pressure are set correspondingly to the evaluation value of the determination on the dross. If the evaluation value for the dross is 0.3, in a specific example, the correction quantity for the laser output power is set to +0.2 [kW], and the correction quantity for the machining gas pressure is set to −0.01 [MPa]. If that evaluation value is 0.6, the correction quantity for the laser output power is set to +0.5 [kW], and the correction quantity for the machining gas pressure is set to −0.02 [MPa].

The correction quantity calculation unit 55 determines the correction quantities on the basis of the above-set correspondences between the evaluation values and the correction quantities. Therefore, when the evaluation value for the dross is 0.3, the laser machining apparatus increases the laser output power by 0.2 [kW] and decreases the machining gas pressure by 0.01 [MPa]. When that evaluation value is 0.6, the laser machining apparatus 50 increases the laser output power by 0.5 [kW] and decreases the machining gas pressure by 0.02 [MPa]. The above-mentioned correction quantities are examples. Correction quantities only have to be set correspondingly to evaluation values. The correction quantities may be set as values that depend on machining parameter values before correction. The above-described examples are not restrictive of how the correction quantities are determined.

In cases where one of contiguous numbers is output from the evaluation unit 54 as an evaluation value for each machining defect item, the correction quantity calculation unit 55 may use a table showing correspondences between evaluation values and correct ion quantities to calculate a correction quantity for each of the machining parameters by extrapolation or interpolation. The extrapolation method may be a method using polynomial curves or a method using trigonometric functions or conic sections.

While the case example of bad machining quality with respect to the machining defect item is given in the above-described examples, an improvement item of high priority, such as the quality of machining, productivity, or machining stability, may differ depending on the worker. If the machining speed is extremely low, even good machining quality may not be appropriate. Therefore, the machining state analyzer 51 may include an input means to receive from the worker a degree of priority for each of improvement items as an input.

The correction quantity calculation unit 55 may calculate a correction quantity for the machining parameter on the basis of the degree of priority for each improvement item. The correction quantity calculation unit 55 may determine correction quantities for the machining parameter on the basis of the degrees of priority for the plural improvement items that include the productivity, the combination pattern, and the machining stability. For example, depending on the improvement item, the correction quantity may conceivably have an opposite sign for the same machining parameter. In such a case, the correction quantity calculation unit 55 calculates the correction quantity that corresponds to a work item to be prioritized.

The correction quantity calculation unit 55 may determine a correction quantity that has been weighted correspondingly to the degrees of priority. For example, for each improvement item, a weight may be preset for a correction quantity for each machining parameter, and the correction quantity calculation unit 55 may determine the correction quantity to output by multiplying the correction quantity by the weight that corresponds to the degree of priority for the improvement item and adding up correction quantities after the weights have been multiplied. If the weights are determined so that the weight has a greater value for the item to be prioritized, the higher the degree of priority, the more the contribution to the correction quantity to be output increases. In this manner, the correction quantity calculation unit 55 may calculate the correction quantity that has been weighted correspondingly to the degrees of priority.

In cases where the worker wants to detect a forerunner of the machining defect, the laser machining apparatus 50 may detect the forerunner of the machining defect on the basis of a value output by the evaluation unit 54. For example, suppose that the evaluation value that is output by the evaluation unit 54 is somewhere between 0 and 1, inclusive. A range between 0 (inclusive) and 0.4 (exclusive) may be set to indicate good machining, a range between 0.4 and 0.7, inclusive, may be set to indicate the forerunner of the machining defect, and a range of 0.7 or more may be set to indicate had machining. The correction quantity calculation unit 55 may correct the machining parameter if the evaluation value is greater than or equal to 0.4.

Figure 8:
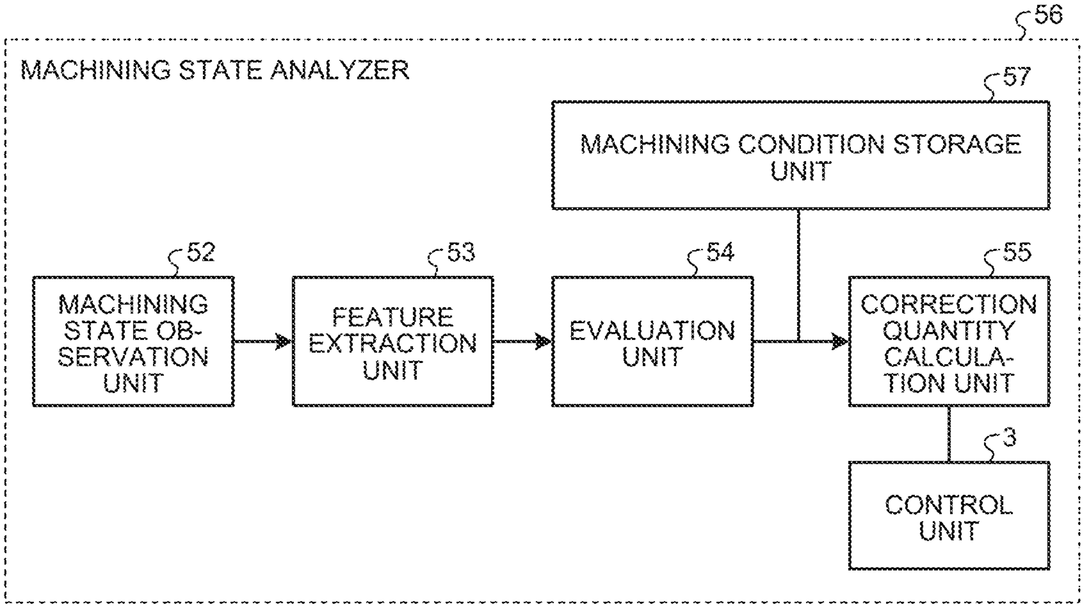
FIG. 8 is a diagram illustrating a configuration of a machining state analyzer of a laser machining apparatus according to a fourth modification of the first embodiment.

The machining state analyzer 51 may determine a correction quantity on the basis of results of past trials. In this case, the machining state analyzer 51 needs to store one or more sets of the machining parameter and evaluation values from the past trial(s). FIG. 8 is a diagram illustrating a configuration of a machining state analyzer 56 of a laser machining apparatus according to a fourth modification of the first embodiment. The laser machining apparatus according to the fourth modification includes all the constituent elements of the laser machining apparatus 50 and a machining condition storage unit 57. The machining condition storage unit 57 is, for example, a semiconductor memory. The machining condition storage unit 57 is included in the machining state analyzer 56. The machining state analyzer 56 determines a correction quantity on the basis of the results of the plural trials. The machining state analyzer 56 also includes the control unit 3, the machining state observation unit 52, the feature extraction unit 53, the evaluation unit 54, and the correction quantity calculation unit 55.

The machining condition storage unit 57 of the machining state analyzer 56 stores the one set of the output evaluation result of the evaluation unit 54 from the preceding trial and the machining parameter that corresponds to the evaluation result or the plural sets of the output evaluation results of the evaluation unit 54 from the plural past trials and the machining parameter that corresponds to the evaluation results. On the basis of an evaluation result output from the evaluation unit 54, and the past evaluation result(s) and the machining parameter that are stored in the machining condition storage unit 57, the correction quantity calculation unit 55 calculates the correction quantity for the machining parameter.

By using not only the current information but also the past information thus in calculating the correction quantity, the correction quantity calculation unit 55 is enabled to have improved accuracy in calculating the correction quantity. For example, the correction quantity calculation unit 55 is capable of calculating a correction quantity by using the sets of the plural evaluation results and the machining parameter as discrete states in a Markov chain. In actual machining condition adjustment, plural combinations of correction conditions are conceivable.

The correction quantity, calculation unit 55 is capable of more accurate correction quantity calculation by selecting one of the sets and also considering how the defect changes its pattern in subsequent trial machining in determining a correction quantity. For example, the correction quantity calculation unit 55 calculates a correction quantity that lowers the focal position, which is the machining parameter, and the laser machining apparatus 50 performs cutting based on the calculated correction quantity.

For example, the machining condition storage unit 57 stores the machining parameter set for the machining and an evaluation result corresponding to a result from the cutting. When an evaluation result output from the evaluation unit 54 is bad, the laser machining apparatus according to the fourth modification moves down the focal position and performs trial laser beam machining. If after the two trials, no improvement is obtained in a determination on the dross, which is one of the machining defect items, the correction quantity calculation unit 55 may calculate a correction quantity that moves up the focal position from a point to which the focal position has been moved down with the two trials on the basis of the sets of the machining parameter and the evaluation values that the machining condition storage unit 57 has stored.

The machining state analyzer 51 may include an input means to receive, as an input from the worker, a threshold to use in determining a level. The level is used as a graded evaluation value corresponding to each machining defect item or an evaluation value constituted by a binary determination result on good or bad. The evaluation unit 54 determines the evaluation value with the input threshold. In cases where the machining state analyzer 51 has the input means, the laser machining apparatus 50 is capable of, for each of workers, fine or rough evaluation level setting for each machining defect item correspondingly to the threshold input by the worker. In cases where the machining state analyzer 51 has the input means, the worker is enabled to set stricter or milder criteria for evaluation values.

Even if laser beam machining starts with good machining, machining defects may occur due to, for example, a changing state of the machining head 2 or minute changes in the material of the workpiece W. For this reason, in continued machining, workers have used a machining speed lower than a machining speed that actually enables the machining. In other words, the workers have done machining at lower productivity than an original capacity.

In order to solve the above-mentioned problem, the present disclosure includes the detection of the process light 8 generated during machining with a wavelength band of the process light 8 divided into the plurality of wavelength bands and the detailed detection of the features that include, for example, the changing wave distributions during the machining, thus enabling the detection of the machining result, the machining defect, or the forerunner of the machining defect. When the forerunner of the machining defect that is about to occur is detected, the correction quantity calculation unit 55 changes the machining parameter. In this way, the machining is enabled to keep up the productivity without causing the machining defect. Even when the machining defect occurs, autonomous return to good machining is enabled.

Instead of correcting the machining parameter after the machining defect, the machining defect item, and the forerunner of the machining defect are detected, the correction quantity calculation unit 55 may correct the machining parameter by receiving the features extracted by the feature extraction unit 53 directly from the feature extraction unit 53. Obtained in this way is an effect of allowing the correction quantity calculation unit 55 to have a reduced load for the calculation because the machining parameter is corrected without a detection process, although the machining defect item and the forerunner of the machining defect will not be detected. The features that are used in the machining defect detection may be the same as or different from the features that are used in the machining parameter correction.

On the basis of the features, the evaluation unit 54 may determine for at least one of the plurality of machining defect items a boundary value between a good machining range that is a machining parameter range where determination results are good and a bad machining range that is a machining parameter range where determination results are bad. In cases where the machining parameter corrected on the basis of the correction quantity is included in the bad machining range, the correction quantity calculation unit 55 may determine a degree of deviation that is a difference between the corrected machining parameter based on the correction quantity and the boundary value, determine a correction quantity for the machining parameter and correct the machining parameter during the machining when the degree of deviation has gone beyond the boundary value. Since the correction quantity calculation unit 55 determines the correction quantity for the machining parameter and corrects the machining parameter during the machining when the degree of deviation has gone beyond the boundary value, the laser machining apparatus 50 is capable of detecting the forerunner of the machining defect with relatively high accuracy.

As described above, the laser machining apparatus 50 according to the first embodiment includes the machining state observation unit 52 that detects, from the process light 8 that is generated from the workpiece W by the laser beam irradiation, the light intensities in the plurality of predetermined wavelength bands of interest as the plurality of optical sensor signals; the feature extraction unit 53 that extracts the feature that serves as the index of correlation between the plurality of optical sensor signals; and the correction quantity calculation unit 55 that determines, on the basis of the feature, the machining parameter to be corrected as the correction parameter and the correction quantity for the correction parameter. Since the above-described feature is used, the laser machining apparatus 50 obtains more information than when light in each of a plurality of wavelength bands is observed individually and thus is capable of detecting the machining state and adjusting the machining condition at a higher speed or with higher accuracy. The feature extraction unit 53 extracts at least one of the features, the features are obtainable from the index of correlation between the plurality of the optical sensor signals and from one of the optical sensor signals.

The evaluation unit 54 according to the first embodiment determines whether the machining is good or bad for the at least one of the plurality of machining defect items on the basis of the features in obtaining the determination result. For example, the correction quantity calculation unit 55 determines the correction parameter to be corrected and the correction quantity for the correction parameter on the basis of the above determination result. In this case, the laser machining apparatus 50 according to the first embodiment is capable of changing the machining condition with higher accuracy at a higher speed, consequently enabling stable continued machining.

Second Embodiment

Figure 9:
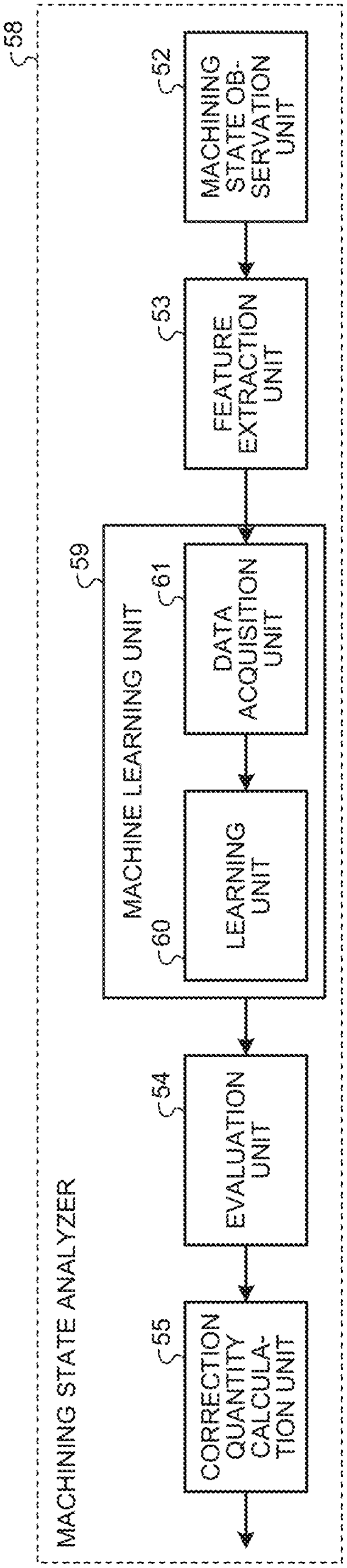
FIG. 9 is a diagram illustrating a configuration of a machining state analyzer of a laser machining apparatus according to a second embodiment.

A laser machining apparatus according to a second embodiment includes a machining state analyzer 58 illustrated in FIG. 9 in place of the machining state analyzer 51 of the laser machining apparatus 50 according to the first embodiment. FIG. 9 is a diagram illustrating a configuration of the machining state analyzer 58 of the laser) machining apparatus according to the second embodiment. The laser machining apparatus according to the second embodiment differs from the laser machining apparatus 50 in that the machining state analyzer 58 that is not included in the laser machining apparatus 50 is included. In the second embodiment, constituent elements with the same functions as those in the first embodiment have the same reference characters as in the first embodiment and are not described in order to omit redundancy. In the second embodiment, a description is provided mainly of difference from the first embodiment.

The machining state analyzer 58 includes the machining state observation unit 52, the feature extraction unit 53, a machine learning unit 59 that learns a relationship between features and evaluation values for machining defect items regarding a machining parameter to be corrected, the evaluation unit 54, and the correction quantity calculation unit 55. The machine learning unit 59 learns to associate the features extracted by the feature extraction unit 53 and evaluation values prepared by a worker. The evaluation values prepared by the worker are values derived from evaluations by the worker. For example, the values derived from the evaluations by the worker may be input from an input means not illustrated or may be output from another device and received by the machine learning unit 59. The machine learning unit 59 may perform arithmetic processing based on the features to output a correction quantity for the machining parameter.

The machine learning unit 59 includes a learning unit 60 and a data acquisition unit 61. The learning unit 60 learns on sets of data that include inputs and outcomes by machine learning. The learning unit 60 may use any machine learning algorithm. The machine learning algorithm that is used by the learning unit 60 is, for example, a supervised learning algorithm. The data acquisition unit 61 obtains from the feature extraction unit 53 the features as inputs to the learning unit 60 and outputs the obtained features to the learning unit 60. The evaluation unit 54 may include the feature extraction unit 53 and the learning unit 60.

The values derived from the evaluations by the worker are also input to the learning unit 60. Each of the values derived from the evaluations by the worker is a determination result on the quality of a machining result for each of the machining defect items and may be a value that indicates one of a plurality of levels or one of contiguous numbers as with the evaluation value obtained as the determination result by the evaluation unit 54 according to the first embodiment. In other words, the values derived from the evaluations by the worker are equivalent to the combination pattern described in the first embodiment and are determined by the worker. The data acquisition unit 61 may obtain time-series light intensity signals that have been output from the optical sensors 13 and processed by the feature extraction unit 53 as inputs to the learning unit 60.

As described above, the data acquisition unit 61 obtains the time-series light intensity data or the features output from the feature extraction unit 53 as state variables and gives the obtained state variables to the learning unit 60. Using the data sets that are each composed of the state variables and the evaluation values, the learning unit 60 performs machine learning of the quality of the machining result. The data set is data in which the state variables are associated with the evaluation data.

The learning unit 60 uses a model learned by the machine learning to output evaluation values corresponding to the features. Therefore, the correction quantity calculation unit 55 is capable of higher-accuracy machining parameter correction. Although the learning unit 60 has both the function of performing machine learning of the quality of the machining result and the function as the learned model, an inference unit that uses the learned model to output evaluation values may be provided separately, from the learning unit 60. In other words, the machining state analyzer 58 may include the inference unit that uses the learned model trained by the learning unit 60 to calculate an informational combination pattern from time-series light intensity data.

In the example of FIG. 9, the machine learning unit 59 is included in the machining state analyzer 58; however, the machine learning unit 59 may be external to the machining state analyzer 58. In that case, the machining state analyzer 58 and the machine learning unit 59 are connected, for example, via a network. The machine learning unit 59 may be on a cloud server.

The machining state analyzer 58 has the evaluation unit 54 described in the first embodiment and may have a learning function that uses determination results determined by the evaluation unit 54. For example, after proceeding with the learning to a certain extent with the above-described data sets, the machining state analyzer 58 may correct a determination result obtained by the evaluation unit 54, and the learning unit 60 may learn on the corrected determination result.

The learning unit 60 uses, for example, a neural network model to learn on the time-series light intensity data and the evaluation results on the quality of the machining result by so-called supervised learning. The supervised learning refers to machine learning in which characteristics are learned on plural data sets, sets of data that each include inputs and outcomes, and outcomes are inferred from inputs. The outcomes included as data in the data sets are labels.

A neural network includes an input layer including a plurality of neurons; an intermediate layer including a plurality of neurons; and an output layer including a plurality of neurons, the intermediate layer is also called a hidden layer. There may be only one intermediate layer or two or more intermediate layers.

Figure 10:
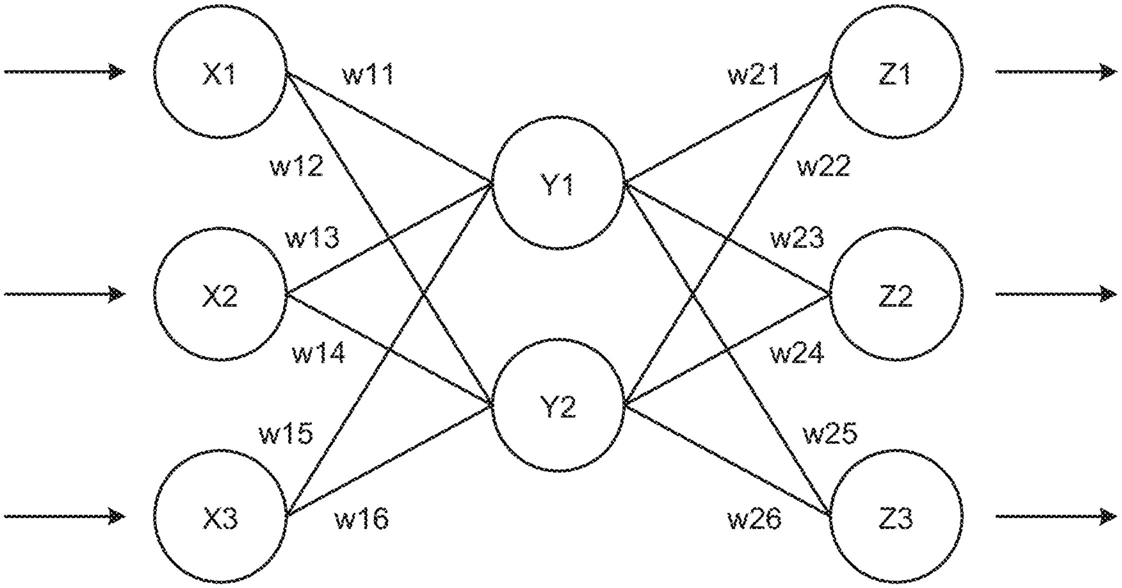
FIG. 10 is a diagram illustrating a configuration of a neural network model according to the second embodiment.

FIG. 10 is a diagram illustrating a configuration of the neural network model according to the second embodiment. X1, X2, and X3 are neurons of an input layer, Y1 and Y2 are neurons of an intermediate layer, and Z1, Z2, and Z3 are neurons of an output layer. In the three-layer neural network model illustrated in FIG. 10, each of three input values, when input to one of X1, X2, and X3, is multiplied by corresponding one of weights w11 to w16 before being input to the neuron Y1 or Y2 of the intermediate layer.

Each of values output from Y1 and Y2 is multiplied by corresponding one of weights w21 to w26 before being input to the neuron Z1, Z2, or Z3 of the output layer. In the output layer, input values are added together, and a value obtained by the addition is output as an output result. For example, the results output from Z1, Z2, and Z3 can be made equivalent to the evaluation results that correspond respectively to the machining defect items. The output results vary according to the weights w11 to w16 and the weights w21 to w26.

In the second embodiment, in order for the output results of the above neural network to approach correct evaluation results on the quality of machining, the learning using the above-described data sets is performed while the weights w11 to w16 and the weights w21 to w26 are adjusted in value. FIG. 10 illustrates the example. The number of layers and the number of neurons in each of the layers in the example neural network model in FIG. 10 are non-limiting.

Using a neural network model, the learning unit 60 can also learn the evaluation results on the quality of machining by so-called unsupervised learning. Unsupervised learning is a method of learning, for example, how to apply compression, classification, or shaping to input data on the basis of only a large number of input data without using corresponding training output data by learning how the input data are distributed. For example, similar features included in input data sets can be clustered together in unsupervised learning. In the unsupervised learning, evaluation results can be predicted by being divided among clustered results so that some criterion is set to optimize the clustered results.

There is also what is called semi-supervised learning as an intermediate problem setting between unsupervised learning and supervised learning. In semi-supervised learning, there are only some sets of data that include inputs and outcomes, while a remaining part includes only input data. The learning unit 60 may perform machine learning with semi-supervised learning.

The machine learning unit 59 may obtain data sets from a plurality of the machining state analyzers 58 and learn evaluation results on the quality of the machining result. Each of the plurality of the machining state analyzers 58 may be the machining state analyzer 58 according to the second embodiment or the machining state analyzer 51 according to the first embodiment. The plurality of the machining state analyzers 58 may be the machining state analyzer 58 and the machining state analyzer 51.

The machine learning unit 59 may obtain data sets from a plurality of the machining state analyzers 58 that are used at the same site or the machining state analyzers 58 operating respectively at a plurality of different sites. The machining state analyzer 58 from which data sets are obtained can be added or removed halfway through the learning. The machine learning unit 59 may be provided separately, from the machining state analyzer 58. In that case, the machine learning unit 59 may learn on data sets obtained from one machining state analyzer 58 and then be connected to another machining state analyzer 58 to obtain from this other machining state analyzer 58 data sets to relearn on.

As described above, the machine learning unit 59 learns the relationship between the time-series light intensity data output from the optical sensors 13 or the features output from the feature extraction unit 53 and the evaluation results on the quality of the machining result. The machine learning unit 59 may learn a relationship between the time-series light intensity data output from the optical sensors 13 or the features output from the feature extraction unit 53 and correction quantities for the machining parameters. In this case, the data acquisition unit 61 obtains the time-series light intensity data output from the optical sensors 13 or the features output from the feature extraction unit 53 and the correction quantities output from the correction quantity calculation unit 55. After the learning, the machine learning unit 59 is capable of calculating and outputting correction quantities for the machining parameters on the basis of the time-series light intensity data output from the optical sensors 13 or the features output from the feature extraction unit 53. In cases where a learned model is prepared to be separate from the machine learning unit 59, the machining state analyzer 58 includes an inference unit that calculates with the learned model trained by the learning unit 60 correction quantities for the machining parameters on the basis of results on the quality of machining.

For input to the learning unit 60, the data acquisition unit 61 may obtain either the thickness of the workpiece W or the material of the workpiece W or both in addition to the time-series light intensity data output from the optical sensors 13 or the features output from the feature extraction unit 53. Deep learning in which extraction of features themselves is learned may be used for a learning algorithm by the learning unit 60. The learning unit 60 may perform machine learning using another publicly known method, such as genetic programming, functional logic programming, a support vector machine, a Fisher's discriminant technique, a subspace method, or discriminant analysis using Mahalanobis space.

A decision tree, a random forest, logistic regression, the k-nearest neighbors algorithm, the subspace method, a class-featuring information compression (CLAFIC) method, Isolation Forest, the local outlier factor (LOF), boosting, AdaBoost, LogitBoost, a one-class support vector machine (SVM), or a Gaussian mixture model may be used by the learning unit 60 as the learning algorithm. In cases where feature extraction from images is learned, as in, for example, deep learning or a convolutional neural network, the feature extraction unit 53 does not have to be provided. The machine learning unit 59 may be provided for each machining defect item. The single machine learning unit 59 may correspond to the plural machining defect items.

As described above, the laser machining apparatus according to the second embodiment performs the machine learning of the determination results on the quality of machining by using the time-series light intensity data output from the optical sensors 13 or the features output from the feature extraction unit 53 and the evaluation results on the quality of the machining result. Therefore, the laser machining apparatus according to the second embodiment produces the same effects as the laser machining apparatus 50 according to the first embodiment and is capable of more accurately determining a correction quantity (or correction quantities) for the machining parameter s) than the laser machining apparatus 50.

The machine learning unit 59 may learn a relationship between the features and evaluation values indicating whether machining is good or bad regarding machining defect items to be evaluated. The machine learning unit 59 may perform arithmetic processing based on the features to output evaluation values for the machining defect items. In this case, the laser machining apparatus is capable of higher-accuracy evaluation of the machining defect items.

Third Embodiment

Figure 11:
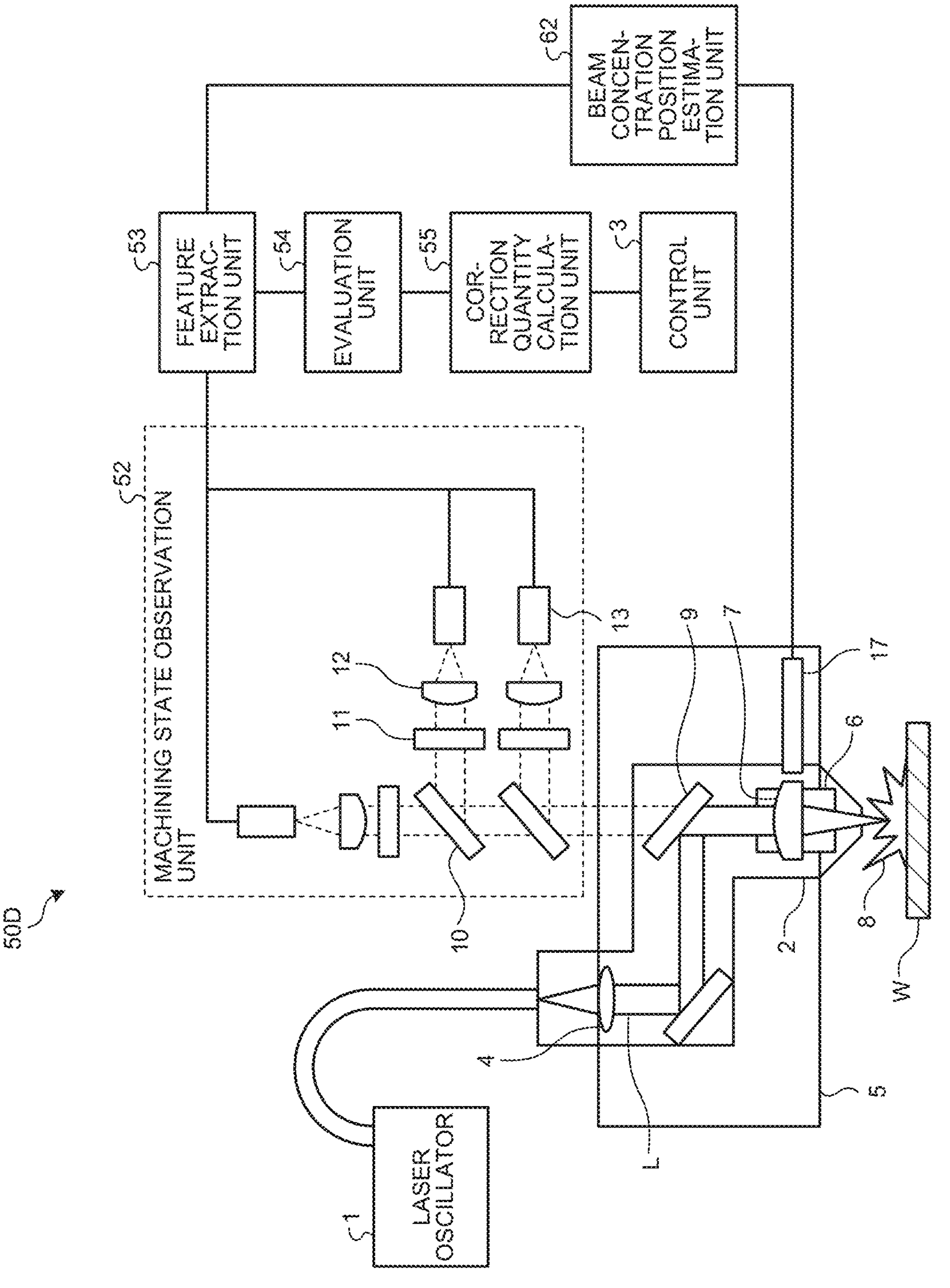
FIG. 11 is a diagram illustrating a configuration of a laser machining apparatus according to a third embodiment.

FIG. 11 is a diagram illustrating a configuration of a laser machining apparatus 50D according to a third embodiment. The laser machining apparatus 50D includes all the constituent elements of the laser machining apparatus 50 according to the first embodiment, a temperature sensor 17, and a beam concentration position estimation unit 62. The beam concentration position estimation unit 62 estimates a beam concentration position that is a position on the workpiece W where a laser beam is concentrated, thus obtaining an estimated beam concentration position. In the third embodiment, the constituent elements with the same functions as those in the first embodiment have the same reference characters as in the first embodiment and are not described in order to omit redundancy. In the third embodiment, a description is provided mainly of difference from the first embodiment.

The machining head 2 internally includes an optical component that transmits or reflects the laser beam that heads for the workpiece W. An example of the optical component is the converging lens 7. The beam concentration position estimation unit 62 detects a chance in temperature of the optical component and estimates the beam concentration position on the basis of the temperature of the optical component, thus obtaining the estimated beam concentration position. On the basis of a determination result and the estimated beam concentration position, the correction quantity calculation unit 55 determines a machining parameter to be corrected and a correction quantity for the machining parameter and corrects the machining parameter during machining.

The laser beam heats matter by being absorbed and causes changes to density and a refractive index of a heated portion of the matter. The transmissive optical component is provided with an antireflection coating made of a material optimized for a wavelength of the laser beam. While a majority of the beam is transmitted by the optical component, a portion of the laser beam is absorbed by the optical component and is converted into heat. The heat causes a difference in the refractive index between the optical component and a periphery of the optical component and the difference in the refractive index causes a lens function in the optical component. The phenomenon in which the heat causes the lens function in the optical component is referred to as a thermal lensing effect. The reflective optical component is provided with a high reflective coating; however, a portion of the laser beam is absorbed and converted into heat, resulting in the thermal lensing effect as in the transmissive optical component.

The laser machining apparatus 50D uses the temperature sensor 17 for measuring the thermal lensing effect and estimates a variation in focal length on the basis of a value output from the temperature sensor 17, power of the current output laser beam L, and an irradiation diameter on the lens. The temperature sensor 17 may be a heat flux sensor that measures heat flux of the optical component. The power of the laser beam L and the irradiation diameter on the lens may be read by the control unit 3.

The correction quantity calculation unit 55 adjusts the focal length on the basis of the variation in focal length. In this way, the laser machining apparatus 50D according to the third embodiment is capable of focal length adjustment using not only time-series process light data but also another feature. Consequently, the laser machining apparatus 50D is capable of higher-accuracy machining condition adjustment. In addition, the laser machining apparatus 50D is capable of evaluating a probability of accuracy of a value output from the evaluation unit 54. Further, the laser machining apparatus 50D uses not only the information obtained by the optical sensors 13 but also the information on the temperature of the optical component and is, therefore, capable of higher-accuracy focal position adjustment.

Figure 12:
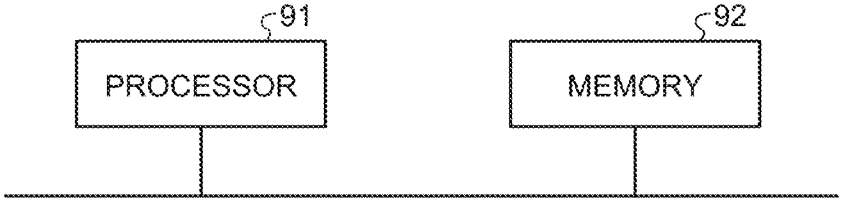
FIG. 12 is a diagram illustrating a processor in cases where the processor is used to implement at least part of a control unit, an actuator, a converging lens position change drive unit, the machining state observation unit, a feature extraction unit, an evaluation unit, and a correction quantity calculation unit of the laser machining apparatus according to the first embodiment.

FIG. 12 is a diagram illustrating a processor 91 in cases where the processor 91 is used to implement at least part of the control unit 3, the actuator 5, the converging lens position change drive unit 6, the machining state observation unit 52, the feature extraction unit 53, the evaluation unit 54, and the correction quantity calculation unit 55 of the laser machining apparatus 50 according to the first embodiment. In other words, at least part of the functions of the control unit 3, the actuator 5, the converging lens position change drive unit 6, the machining state observation unit 52, the feature extraction unit 53, the evaluation unit 54, and the correction quantity calculation unit 55 may be implemented with the processor 91 that executes programs stored in a memory 92. The processor 91 is a central processing unit (CPU), a processing unit, an arithmetic unit, a microprocessor, or a digital signal processor (DSP). The memory 92 is also illustrated in FIG. 12.

In cases where the at least part of the functions of the control unit 3, the actuator 5, the converging lens position change drive unit 6, the machining state observation unit 52, the feature extraction unit 53, the evaluation unit 54, and the correction quantity calculation unit 55 is implemented with the processor 91, the at least part of the functions is implemented with the processor 91 and software, firmware, or a combination of software and firmware. The software or the firmware is described as programs and is stored in the memory 92. The processor 91 reads and executes the programs stored in the memory 92 to implement the at least part of the functions of the control unit 3, the actuator 5, the converging lens position change drive unit 6, the machining state observation unit 52, the feature extraction unit 53, the evaluation unit 54, and the correction quantity calculation unit 55.

In cases where the at least part of the functions of the control unit 3, the actuator 5, the converging lens position change drive unit 6, the machining state observation unit 52, the feature extraction unit 53, the evaluation unit 54, and the correction quantity calculation unit 55 is implemented with the processor 91, the memory 92 is included in the laser machining apparatus 50 to store the programs with which at least part of the steps for the control unit 3, the actuator 5, the converging lens position change drive unit 6, the machining state observation unit 52, the feature extraction unit 53, the evaluation unit 54, and the correction quantity calculation unit 55 is eventually executed. The programs stored in the memory 92 can be said to cause a computer to perform at least part of procedures or methods of the control unit 3, the actuator 5, the converging lens position change drive unit 6, the machining state observation unit 52, the feature extraction unit 53, the evaluation unit 54, and the correction quantity calculation unit 55.

The memory 92 is, for example, a nonvolatile or volatile semiconductor memory such as a random access memory (RAM), a read only memory (ROM), a flash memory, an erasable programmable read only memory (EPROM), or an electrically erasable programmable read-only memory (EEPROM) (registered trademark); a magnetic disk; a flexible disk; an optical disk; a compact disk; a mini disk; a digital versatile disk (DVD); or the like.

Figure 13:
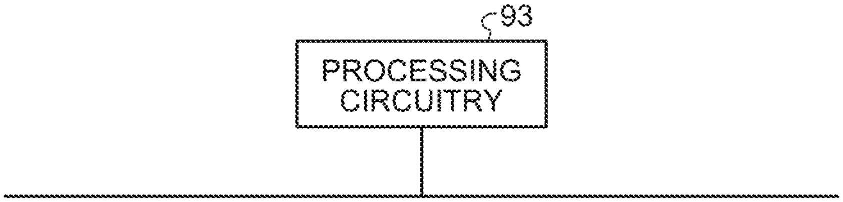
FIG. 13 is a diagram illustrating processing circuitry in cases where the processing circuitry is used to implement at least part of the control unit, the actuator, the converging lens position change drive unit, the machining state observation unit, the feature extraction unit, the evaluation unit, and the correction quantity calculation unit of the laser machining apparatus according to the first embodiment.

FIG. 13 is a diagram illustrating processing circuitry 93 in cases where the processing circuitry 93 is used to implement at least part of the control unit 3, the actuator 5, the converging lens position change drive unit 6, the machining state observation unit 52, the feature extraction unit 53, the evaluation unit 54, and the correction quantity calculation unit 55 of the laser machining apparatus 50 according to the first embodiment. In other words, the at least part of the control unit 3, the actuator 5, the converging lens position change drive unit 6, the machining state observation unit 52, the feature extraction unit 53, the evaluation unit 54, and the correction quantity calculation unit 55 may be implemented with the processing circuitry 93.

The processing circuitry 93 is dedicated hardware. The processing circuitry 93 is, for example, a single circuit, a composite circuit, a programmed processor, a parallel programmed processor, an application specific integrated circuit (ASIC), a field-programmable gate array (FPGA), or a combination of these.

Part of the control unit 3, the actuator 5, the converging lens position change drive unit 6, the machining state observation unit 52, the feature extraction unit 53, the evaluation unit 54, and the correction quantity calculation unit 55 may be implemented with different dedicated hardware separately from a remaining part.

Part of the plural functions of the control unit 3, the actuator 5, the converging lens position change drive unit 6, the machining state observation unit 52, the feature extraction unit 53, the evaluation unit 54, and the correction quantity calculation unit 55 may be implemented with software or firmware, while a remaining part of the plural functions may be implemented with dedicated hardware. As described above, the plural functions of the control unit 3, the actuator 5, the converging lens position change drive unit 6, the machining state observation unit 52, the feature extraction unit 53, the evaluation unit 54, and the correction quantity calculation unit 55 are implementable with the hardware, the software, the firmware, or the combination of these.

At least part of the functions of the machining state observation unit 52, the feature extraction unit 53, the machine learning unit 59, the evaluation unit 54, and the correction quantity calculation unit 55 of the machining state analyzer 58 of the laser machining apparatus according to the second embodiment may be implemented with a processor that executes programs stored in a memory. The memory is the same as the memory 92, and the processor is the same as the processor 91. At least part of the machining state observation unit 52, the feature extraction unit 53, the machine learning unit 59, the evaluation unit 54, and the correction quantity calculation unit 55 mentioned above may be implemented with processing circuitry. The processing circuitry is the same as the processing circuitry 93.

At least part of the functions of the machining state observation unit 52, the feature extraction unit 53, the evaluation unit 54, the correction quantity calculation unit 55, and the beam concentration position estimation unit 62 of the laser machining apparatus 50D according to the third embodiment may be implemented with a processor that executes programs stored in a memory. The memory is the same as the memory 92, and the processor is the same as the processor 91. At least part of the machining state observation unit 52, the feature extraction unit 53, the evaluation unit 54, the correction quantity calculation unit 55, and the beam concentration position estimation unit 62 mentioned above may be implemented with processing circuitry. The processing circuitry is the same as the processing circuitry 93.

The above configurations illustrated in the embodiments are illustrative, can be combined with other techniques that are publicly known, and can be partly omitted or changed without departing from the gist. The embodiments can be combined together.

REFERENCE SIGNS LIST

1 laser oscillator; 2 machining head; 3 control unit; 4, 14 collimator lens; 5 actuator; 6 converging lens position change drive unit; 7 converging lens; 8 process light; 9 mirror; 10 beam splitter; 10*a* diffraction grating; 10*b* prism; 11 wavelength filter; 12 imaging lens; 13 optical sensor; 13*a* first optical sensor; 13*b* second optical sensor; 13*c* third optical sensor; 15 optical fiber; 17 temperature sensor; 50, 50A, 50B, 505, 50D laser machining apparatus; 51, 56, 58 machining state analyzer; 52, 52A, 52B machining state observation unit; 53 feature extraction unit; 54 evaluation unit; 55 correction quantity calculation unit; 57 machining condition storage unit; 59 machine learning unit; 60 learning unit; 61 data acquisition unit; 62 beam concentration position estimation unit; 91 processor; 92 memory; 93 processing circuitry.

The invention claimed is:

1. A laser machining apparatus comprising:

an actuator to change relative positions of a machining head and an object to be machined, the machining head including a focusing system to focus a laser beam emitted from a laser oscillator and irradiate the object to be machined and a machining gas supply device to supply a machining gas to the object to be machined;

a controlling circuitry to control in machining execution the laser oscillator, the machining head, and the actuator on a basis of a machining parameter, the machining parameter being a laser beam machining-related numeric parameter;

a machining state observing circuitry to detect, from process light, light intensities in a plurality of predetermined wavelength bands of interest as a plurality of optical sensor signals, the process light being light generated from the object to be machined by laser beam irradiation;

a feature extracting circuitry to extract at least one of features, the features being obtainable from an index of correlation between the plurality of optical sensor signals and from one of the optical sensor signals;

a correction quantity calculating circuitry to determine the machining parameter to be corrected as a correction parameter and a correction quantity for the correction parameter on a basis of the at least one of the features; and a machine learning circuitry to learn a relationship between the at least one of the features and an evaluation value indicating whether machining is good or bad regarding a machining defect item to be evaluated, wherein the correction quantity calculating circuitry includes an evaluating circuitry to determine for at least one of a plurality of machining defect items whether machining is good or bad on the basis of the at least one of the features in obtaining a determination result and determines the correction parameter to be corrected and a correction quantity for the correction parameter on a basis of the determination result, and the machine learning circuitry performs arithmetic processing based on the at least one of the features in outputting an evaluation value for the machining defect item.

2. A laser machining apparatus comprising:

an actuator to change relative positions of a machining head and an object to be machined, the machining head including a focusing system to focus a laser beam emitted from a laser oscillator and irradiate the object to be machined and a machining gas supply device to supply a machining gas to the object to be machined;

a controlling circuitry to control in machining execution the laser oscillator, the machining head, and the actuator on a basis of a machining parameter, the machining parameter being a laser beam machining-related numeric parameter;

a machining state observing circuitry to detect, from process light, light intensities in a plurality of predetermined wavelength bands of interest as a plurality of optical sensor signals, the process light being light generated from the object to be machined by laser beam irradiation;

a feature extracting circuitry to extract at least one of features, the features being obtainable from an index of correlation between the plurality of optical sensor signals and from one of the optical sensor signals; and a correction quantity calculating circuitry to determine the machining parameter to be corrected as a correction parameter and a correction quantity for the correction parameter on a basis of the at least one of the features, wherein the correction quantity calculating circuitry includes an evaluating circuitry to determine for at least one of a plurality of machining defect items whether machining is good or bad on the basis of the at least one of the features in obtaining a determination result and determines the correction parameter to be corrected and a correction quantity for the correction parameter on a basis of the determination result, on the basis of the at least one of the features, the evaluating circuitry determines for at least one of the plurality of machining defect items a boundary value between a good machining range and a bad machining range, the good machining range being a machining parameter range where the determination result is good, the bad machining range being a machining parameter range where the determination result is bad, and in cases where the machining parameter corrected on a basis of the correction quantity is included in the bad machining range, the correction quantity calculating circuitry determines a degree of deviation, determines a correction quantity for the machining parameter and corrects the machining parameter during machining when the degree of deviation has gone beyond the boundary value, the degree of deviation being a difference between the machining parameter corrected on the basis of the correction quantity and the boundary value.

3. The laser machining apparatus according to claim 1, further comprising a beam concentration position estimating circuitry to estimate a beam concentration position that is a position on the object to be machined where the laser beam is concentrated in obtaining an estimated beam concentration position, wherein the machining head internally includes an optical component that transmits or reflects the laser beam that heads for the object to be machined, the beam concentration position estimating circuitry detects a change in temperature of the optical component and estimates the beam concentration position on a basis of the temperature of the optical component in obtaining the estimated beam concentration position, and on a basis of the determination result and the estimated beam concentration position, the correction quantity calculating circuitry determines the machining parameter to be corrected and a correction quantity for the machining parameter and corrects the machining parameter during machining.

4. The laser machining apparatus according to claim 1, wherein the machining state observing circuitry includes a first optical sensor disposed at a position aligned with an irradiation direction of the emitted laser beam of the laser oscillator toward a machining point and a second optical sensor disposed at a position aligned with a direction different from the irradiation direction of the emitted laser beam of the laser oscillator toward the machining point.

5. The laser machining apparatus according to claim 1, wherein the plurality of machining defect items include at least one of items for cut surface roughness in terms of quality, gouging, dross, or peeling off of an oxide film.

6. The laser machining apparatus according to claim 1, wherein the correction quantity calculating circuitry determines at least one of cutting speed, a focal position, a diameter of a converged beam, gas pressure, or laser output power as a machining parameter to be corrected and determines a correction quantity for the machining parameter.

7. The laser machining apparatus according to claim 1, wherein the machining state observing circuitry includes a shortpass filter to transmit light including a wavelength shorter than or equal to a first wavelength, a longpass filter to transmit light including a wavelength longer than or equal to a second wavelength, and a bandpass filter to transmit light including a wavelength longer than the first wavelength and shorter than the second wavelength.

8. The laser machining apparatus according to claim 1, wherein the machining state observing circuitry includes a first wavelength filter to transmit light including a wavelength shorter than 525 nm, a second wavelength filter to transmit light including a wavelength longer than 700 nm, and a third wavelength filter to transmit light including a wavelength between 530 nm and 700 nm, inclusive.

9. The laser machining apparatus according to claim 1, wherein the machining state observing circuitry includes a wavelength filter to transmit light including a wavelength between 475 nm and 525 nm, inclusive, a wavelength filter to transmit light including a wavelength between 575 nm and 625 nm, inclusive, and a wavelength filter to transmit light including a wavelength between 675 nm and 725 nm, inclusive.

10. The laser machining apparatus according to claim 1, wherein the machining state observing circuitry includes a wavelength filter to transmit light including a wavelength between 400 nm and 800 nm, inclusive, a wavelength filter to transmit light including a wavelength between 475 nm and 525 nm, inclusive, and a wavelength filter to transmit light including a wavelength between 675 nm and 725 nm, inclusive.

11. The laser machining apparatus according to claim 1, wherein during machining, on a basis of the process light that is transmitted from the machining head by an optical fiber, the laser machining apparatus determines a correction quantity for the machining parameter or determines whether machining is good or bad for a machining defect item to be corrected.

12. The laser machining apparatus according to claim 1, wherein the evaluating circuitry includes:

a feature extracting circuitry to extract the at least one of the features; and a learning circuitry to learn a relationship between the at least one of the features and the determination result and determine the determination result on a basis of a learned result.

13. The laser machining apparatus according to claim 2, further comprising a beam concentration position estimating circuitry to estimate a beam concentration position that is a position on the object to be machined where the laser beam is concentrated in obtaining an estimated beam concentration position, wherein the machining head internally includes an optical component that transmits or reflects the laser beam that heads for the object to be machined, the beam concentration position estimating circuitry detects a change in temperature of the optical component and estimates the beam concentration position on a basis of the temperature of the optical component in obtaining the estimated beam concentration position, and on a basis of the determination result and the estimated beam concentration position, the correction quantity calculating circuitry determines the machining parameter to be corrected and a correction quantity for the machining parameter and corrects the machining parameter during machining.

14. The laser machining apparatus according to claim 2, wherein the machining state observing circuitry includes a first optical sensor disposed at a position aligned with an irradiation direction of the emitted laser beam of the laser oscillator toward a machining point and a second optical sensor disposed at a position aligned with a direction different from the irradiation direction of the emitted laser beam of the laser oscillator toward the machining point.

15. The laser machining apparatus according to claim 2, wherein the plurality of machining defect items include at least one of items for cut surface roughness in terms of quality, gouging, dross, or peeling off of an oxide film.

16. The laser machining apparatus according to claim 2, wherein the correction quantity calculating circuitry determines at least one of cutting speed, a focal position, a diameter of a converged beam, gas pressure, or laser output power as a machining parameter to be corrected and determines a correction quantity for the machining parameter.

17. The laser machining apparatus according to claim 2, wherein the machining state observing circuitry includes a shortpass filter to transmit light including a wavelength shorter than or equal to a first wavelength, a longpass filter to transmit light including a wavelength longer than or equal to a second wavelength, and a bandpass filter to transmit light including a wavelength longer than the first wavelength and shorter than the second wavelength.

18. The laser machining apparatus according to claim 2, wherein the machining state observing circuitry includes a first wavelength filter to transmit light including a wavelength shorter than 525 nm, a second wavelength filter to transmit light including a wavelength longer than 700 nm, and a third wavelength filter to transmit light including a wavelength between 530 nm and 700 nm, inclusive.

19. The laser machining apparatus according to claim 2, wherein the machining state observing circuitry includes a wavelength filter to transmit light including a wavelength between 475 nm and 525 nm, inclusive, a wavelength filter to transmit light including a wavelength between 575 nm and 625 nm, inclusive, and a wavelength filter to transmit light including a wavelength between 675 nm and 725 nm, inclusive.

20. The laser machining apparatus according to claim 2, wherein the machining state observing circuitry includes a wavelength filter to transmit light including a wavelength between 400 nm and 800 nm, inclusive, a wavelength filter to transmit light including a wavelength between 475 nm and 525 nm, inclusive, and a wavelength filter to transmit light including a wavelength between 675 nm and 725 nm, inclusive.

21. The laser machining apparatus according to claim 2, wherein during machining, on a basis of the process light that is transmitted from the machining head by an optical fiber, the laser machining apparatus determines a correction quantity for the machining parameter or determines whether machining is good or bad for a machining defect item to be corrected.

* * * * *